United States Patent
Nozawa et al.

(10) Patent No.: US 6,513,319 B2
(45) Date of Patent: Feb. 4, 2003

(54) CATALYST ACTIVATION CONTROL SYSTEM FOR ENGINES

(75) Inventors: Masaei Nozawa, Okazaki (JP); Sigenori Isomura, Kariya (JP); Yoshihiro Majima, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/873,397

(22) Filed: Jun. 5, 2001

(65) Prior Publication Data

US 2001/0035008 A1 Nov. 1, 2001

Related U.S. Application Data

(62) Division of application No. 09/274,996, filed on Mar. 24, 1999, now Pat. No. 6,266,957.

(30) Foreign Application Priority Data

Mar. 25, 1998 (JP) .............................. 10-77559
Mar. 1, 1999 (JP) .............................. 11-52496

(51) Int. Cl.$^7$ ................................ F01N 3/20
(52) U.S. Cl. ................ 60/284; 123/90.15; 123/406.53
(58) Field of Search .......................... 123/90.15, 90.16, 123/90.17, 90.18, 406.23, 406.26, 406.53; 60/274, 284, 285

(56) References Cited

U.S. PATENT DOCUMENTS

| | | | |
|---|---|---|---|
| 5,211,011 A | 5/1993 | Nishikawa et al. | 60/284 |
| 5,233,831 A | 8/1993 | Hitomi et al. | 60/284 |
| 5,293,741 A | 3/1994 | Kashiyama et al. | 60/284 |
| 5,529,031 A | 6/1996 | Yoshioka | 123/90.15 |
| 5,622,144 A * | 4/1997 | Nakamura et al. | 123/90.15 |
| 5,848,529 A * | 12/1998 | Katoh et al. | 60/274 |
| 5,850,811 A | 12/1998 | Tomisawa et al. | 60/284 |
| 5,894,724 A | 4/1999 | Minowa et al. | 60/274 |
| 5,950,419 A | 9/1999 | Nishimura et al. | 60/284 |
| 5,975,046 A | 11/1999 | Kancko et al. | 60/284 |
| 6,041,591 A | 3/2000 | Kaneko et al. | 60/274 |
| 6,266,957 B1 * | 7/2001 | Nozawa et al. | 60/284 |

FOREIGN PATENT DOCUMENTS

| | | | |
|---|---|---|---|
| JP | 60-138217 | 7/1985 | |
| JP | 61-190118 | 8/1986 | |
| JP | 61-232317 | 10/1986 | |
| JP | 4159428 | * 6/1992 | 123/284 |
| JP | 4-194338 | 7/1992 | |
| JP | 5-59936 | 3/1993 | |
| JP | 5-215000 | 8/1993 | |

* cited by examiner

*Primary Examiner*—Willis R. Wolfe
(74) *Attorney, Agent, or Firm*—Nixon & Vanderhye P.C.

(57) ABSTRACT

An engine has variable timing mechanisms, which are controlled in starting an engine to set valve opening overlap of an intake valve and an exhaust valve around 30° CA. In this case, internal EGR is actively conducted and fuel burning velocity within a cylinder becomes relatively slow and unburned fuel within the cylinder is emitted to an exhaust pipe to be post-burned by itself. Temperature of exhaust gas is maintained high and catalyst converters in the cold state may be activated quickly by actively implementing the post-burning within the exhaust pipe. Further, ignition timing is retarded, an air-fuel ratio is controlled at a slightly lean ratio and the exhaust valve is advanced. The effect of raising the temperature of exhaust gas by the post-burning may be realized more reliably by combining each of these controls.

21 Claims, 20 Drawing Sheets

CATALYST ACTIVATION CONTROL SYSTEM FOR ENGINES

CROSS REFERENCE TO RELATED APPLICATION

The application is a division of our copending commonly assigned application Ser. No. 09/274,996 filed Mar. 24, 1999 (and now U.S. Pat. No. 6,266,957 B1).

This application relates to and incorporates herein by reference Japanese patent Applications No. 10-77559 filed on Mar. 25, 1998 and No. 11-52496, filed on Mar. 1, 1999.

BACKGROUND OF THE INVENTION

1. Field of the Invention

The present invention relates to a control system for an internal combustion engine, and more particularly to a control system for an internal combustion engine for realizing quick activation of a catalyst converter when the internal combustion engine is cold.

2. Description of the Related Art

In is recently required for engine emission control to maintain a catalyst converter in an exhaust pipe of an internal combustion engine always at an adequate active state. For instance, it is desired to shorten engine warm-up time and to activate the catalyst converter quickly in warming up the catalyst converter from the cold state in starting an engine at low temperature.

It is required for engine emission control recently to maintain a catalyst converter provided in an exhaust pipe of an internal combustion engine always at an adequate active state. For instance, it is desired to shorten an engine warm-up time and to activate the catalyst converter quickly in warming up the catalyst converter from the cold state in starting an engine at low temperature.

In JP-A-61-232317, it is proposed to advance timing of opening an exhaust valve of an internal combustion engine to supply exhaust gas having a large amount of heat energy to an exhaust pipe to raise exhaust gas temperature. In JP-A-61-190118, it is proposed to advance valve timing of an exhaust valve when an internal combustion engine is cold to reduce combustion gas expansion ratio and to raise exhaust gas temperature.

However, those conventional systems are directed to raise the temperature of the exhaust gas just by thermal energy of combustion gas within a cylinder. The effect of raising the temperature does not necessarily result in activating the catalyst quickly. Although a start catalyst whose capacity is relatively small has been put into practical use in order to activate the catalyst quickly, such a quick activating type catalyst has been also required to be able to activate more quickly.

SUMMARY OF THE INVENTION

The present invention has an object to provide a control system for an internal combustion engine which can activate the catalyst converter quickly when the internal combustion engine is cold.

According to the present invention, a variable valve timing mechanism is controlled when an internal combustion engine is cold to control valve opening overlap between an intake valve and an exhaust valve to a predetermined amount.

Burned gas within a cylinder is blown back to an intake port side and flows into the cylinder again, i.e., internal EGR is actively conducted, so that combustion velocity of fuel within the cylinder becomes relatively slow by increasing the valve opening overlap of the intake valve and the exhaust valve. At this time, unburned fuel not burned within the cylinder is emitted to an exhaust pipe to be burned by itself. Here, the phenomenon in which the unburned fuel is burned within the exhaust pipe at the upstream of the catalyst converter will be defined as post-burning. Temperature of exhaust gas may be kept high by thus actively conducting post-burning within the exhaust pipe. Then, the catalyst converter in the cold state may be activated quickly by feeding the high temperature exhaust gas to the catalyst converter. As a result, the catalyst converter may be activated quickly when the internal combustion engine is cold.

Here, because the temperature of exhaust gas emitted via the exhaust valve after combustion within the cylinder reaches about 700° C. at which gasoline fuel fires by itself, most of the unburned fuel (unburned HC) is burned during the post-burning. Accordingly, the amount of HC as the unburned fuel (unburned HC) fed to the catalyst converter before it is activated is very small.

Preferably, the valve opening overlap of the intake valve and the exhaust valve is set around 20 to 30° crank angle rotation (CA). Concentration of HC of unburned gas emitted out of the cylinder increases and the effect of the above internal EGR may be attained reliably by setting the valve opening overlap within the above range.

Preferably, ignition timing of the internal combustion engine is also controlled to the retard side when the internal combustion engine is cold. Fuel (air and fuel mixture) flowing in the cylinder starts to burn slowly and unburned fuel is emitted to the exhaust pipe when the exhaust valve is opened to be burned in the post-burning by retarding the ignition timing.

Preferably, an air-fuel ratio of intake air and fuel mixture is controlled to a stoichiometric air-fuel ratio or a slightly lean ratio when the internal combustion engine is cold. The amount of oxygen within the exhaust gas increases and the post-burning may be carried out more reliably by controlling the air-fuel ratio to the stoichiometric air-fuel ratio or to the slightly lean ratio. In this case, the effect of increasing the temperature of exhaust gas may be attained further by controlling the air-fuel ratio to the stoichiometric air-fuel ratio or the slightly lean ratio while controlling the valve opening overlap and the ignition timing.

Preferably, the variable valve timing mechanism is controlled when the internal combustion engine is cold to vary valve opening timing of the exhaust valve to the advance side more than that right after starting the engine. The remaining unburned fuel is emitted quickly via the exhaust valve by advancing the opening timing of the exhaust valve. Accordingly, it becomes possible to emit the exhaust gas around the peak of the cylinder inner temperature, thus contributing to the promotion of the post-burning. In this case, the effect of increasing the temperature of the exhaust gas may be attained further by advancing the valve timing of the exhaust valve while controlling the valve opening overlap, the ignition timing and the air-fuel ratio.

BRIEF DESCRIPTION OF THE DRAWINGS

The specific nature of the invention, as well as other objects, uses and advantages thereof, will clearly appear from the following description and from the accompanying drawings. In the drawings.

DETAILED DESCRIPTION OF THE PREFERRED EMBODIMENTS (First Embodiment)

Figure 1:
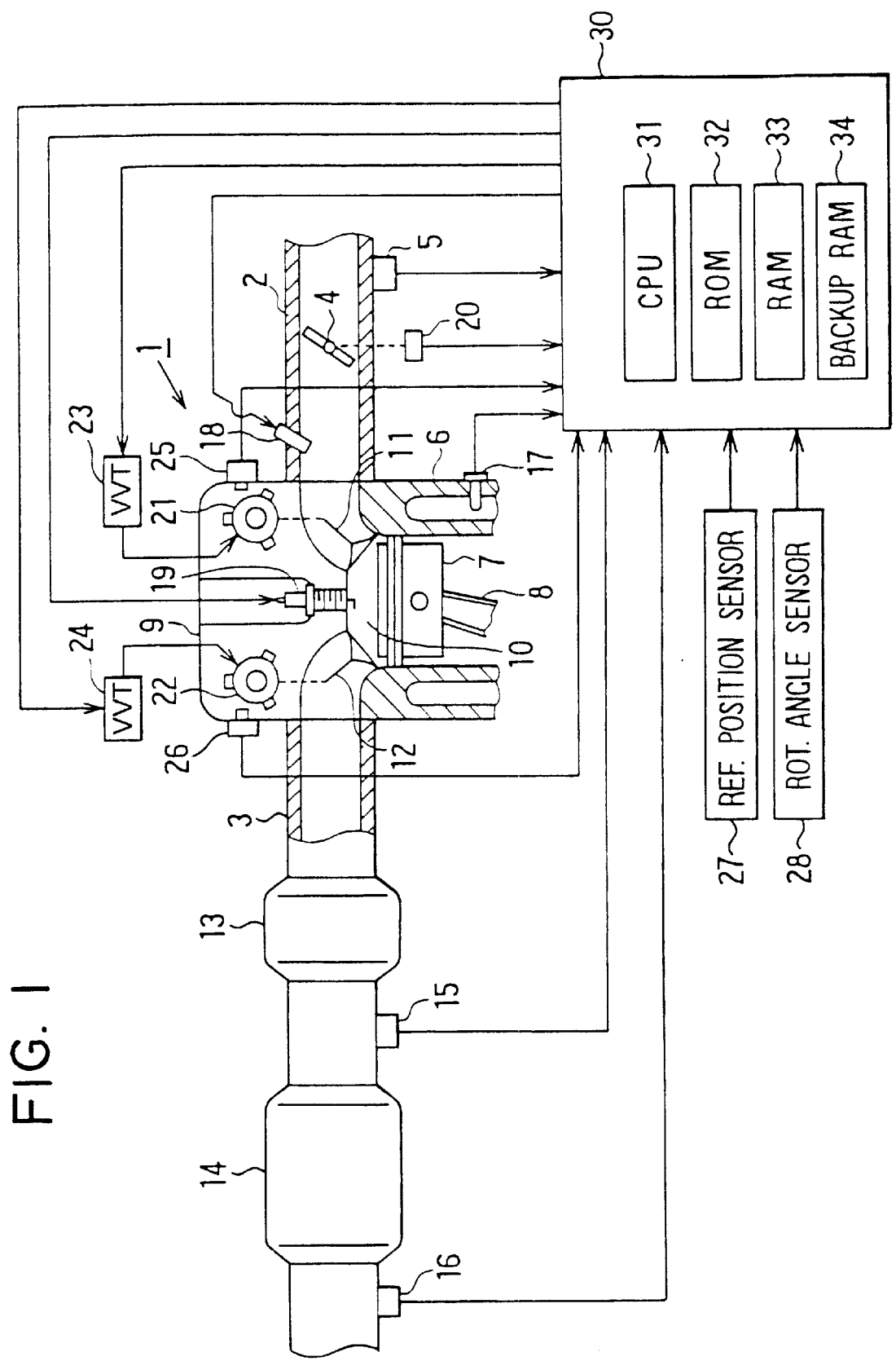
FIG. 1 is a schematic view showing a catalyst activation control system according to a first embodiment of the invention.

In FIG. 1, an internal combustion engine 1 is a spark ignition four-cycle multiple cylinder type, in which an intake port and an exhaust port are connected with an intake pipe 2 and an exhaust pipe 3, respectively. A throttle valve 4 which is linked with an accelerator pedal (not shown) is provided in the intake pipe 2 and an airflow meter 5 for detecting an amount of intake air is disposed thereon. A throttle sensor 20 is provided to detect an opening angle of the throttle valve 4. It also detects a state in which the throttle is totally closed.

A piston 7, which reciprocates up and down in the figure, is disposed within a cylinder 6. The piston 7 is connected with a crankshaft (not shown) via a connecting rod 8. A combustion chamber 10 defined by the cylinder 6 and a cylinder head 9 is provided above the piston 7. The combustion chamber 10 communicates with the intake pipe 2 and the exhaust pipe 3 via an intake valve 11 and an exhaust valve 12. A water coolant temperature sensor 17 for detecting temperature of engine cooling water is disposed on the cylinder (water jacket) 6.

Two catalyst converters 13 and 14 are disposed in the exhaust pipe 3. These catalyst converters 13 and 14 comprise three-way catalysts for purifying three components of HC, CO and NOx within exhaust gas. The catalyst converter 13 at the upstream side has a small capacity as compared with the catalyst converter 14 at the downstream side. The catalyst converter 13 operates as a start catalyst as it is warmed up relatively quickly right after the engine is started. It is noted that the catalyst converter 13 at the upstream side is provided at the position separated from the end face of the engine exhaust port by about 300 mm.

An air-fuel ratio (A/F) sensor 15, which is a limited current type, is provided at the upstream side of the catalyst converter 14 and outputs a wide-range and linear air-fuel ratio signal in proportional to concentration of oxygen in exhaust gas (or concentration of carbon monoxide within unburned gas). An $O_2$ sensor 16 which outputs a different voltage signal on the boundary of stoichiometric air-fuel ratio depending on whether it is on the rich side or lean side is provided at the downstream side of the catalyst converter 14.

High pressure fuel is supplied to an electromagnetic injector 18 from a fuel supply system (not shown), so that the injector 18 injects and supplies fuel to the intake port of the engine 1 when it is energized. A multi-point injection (MPI) system having the injector 18 per every ramified pipe of the intake manifold is structured in the present embodiment. An ignition plug 19 disposed on the cylinder head 9 ignites by igniting high voltage supplied from an igniter (not shown).

In the engine 1, fresh air supplied from the upstream side of the intake pipe 2 and fuel injected by the injector 18 are mixed in the engine intake port and the mixed air flows into the combustion chamber 10 when the intake valve 11 opens. The fuel flown into the combustion chamber 10 is ignited and burnt by ignition spark caused by the ignition plug 19.

An intake side camshaft 21 for opening/closing the intake valve 11 at predetermined timing and an exhaust side camshaft 22 for opening/closing the exhaust valve 12 at predetermined timing are connected and driven by the crankshaft via a timing belt or the like (not shown). A hydraulically driven intake side VVT mechanism 23 is provided on the intake side camshaft 21 and a hydraulically driven exhaust side VVT mechanism 24 is also provided on the exhaust side camshaft 22.

The intake side and exhaust side VVT mechanisms 23 and 24 are provided as phase controlled variable valve timing mechanism for controlling a relative rotational phase between the intake side and exhaust side camshafts 21 and 22. Operations of those mechanisms 23 and 24 are controlled in accordance with hydraulic pressure controlled by solenoid valves (not shown). That is, corresponding to the control amount of the intake side and exhaust side VVT mechanisms 23 and 24, the intake side and exhaust side camshafts 21 and 22 retards or advances with respect to the crankshaft rotation position. Further, corresponding to that operation, the opening/closing timing of the intake and exhaust valves 11 and 12 retards or advances.

An intake side cam position sensor 26 for detecting rotary position of the camshaft 21 is provided on the intake side camshaft 21, and an exhaust side cam position sensor 26 for detecting rotary position of the camshaft 22 is provided on the exhaust side camshaft 22.

An electronic control unit (ECU) 30 comprises mainly a microcomputer composed of a CPU 31, a ROM 32, a RAM 33, a backup RAM 34 and others. The ECU 30 receives signals detected respectively by the airflow meter 5, the A/F sensor 15, the $O_2$ sensor 16, the coolant temperature sensor 17, the throttle sensor 20 and the cam position sensors 25 and 26. Based on the respective detection signals, ECU 30 detects engine operating conditions such as a quantity of intake air Qa, air-fuel ration (A/F) on the upstream and downstream sides of the catalyst, engine coolant temperature Tw, a throttle opening, and position of the cams. The ECU 30 is connected with a reference position sensor 27 which outputs a pulse signal per every 720° CA and a rotational angle sensor 28 which outputs a pulse signal per every small crank angle rotation, e.g., per every 30° CA. The ECU 30 receives the pulse signals from these sensors 27 and 28 to detect the reference crank position (G signal) and engine speed Ne.

Based on those engine operating conditions, the ECU 30 controls fuel injection implemented by the injector 18, timing of ignition implemented by the ignition plug 19 and timing for opening/closing the intake and exhaust valves 11 and 12 implemented by the VVT mechanisms 23 and 24.

According to the present embodiment, the following operations are carried out to quickly activate the catalyst converters 13 and 14 when the engine 1 is started cold:

(a) control the air-fuel ratio at a slightly lean ratio;

(b) control the ignition timing at retard side;

(c) increase valve opening overlap of the intake valve 11 and the exhaust valve 12; and (d) advance valve opening timing of the exhaust valve 12.

All of the operations (a) through (d) described above are carried out to emit part of fuel out of the cylinder as unburned fuel and to burn the unburned fuel within the exhaust pipe 3 including the engine exhaust port, i.e., to carry out a post-burning as follows.

While the fuel injected by the injector 18 burns within the cylinder as the ignition plug 19 ignites, starting of burning is delayed by controlling the ignition timing to the retard side (the operation (b) described above). Burned gas within the cylinder is blown back to the intake port side and flows into the cylinder again by increasing the valve opening overlap between the intake valve 11 and the exhaust valve 12 (operation (c)). That is, an internal EGR is actively carried out, thus slowing fuel burning rate within the cylinder relatively.

Further, by advancing the valve opening timing of the exhaust valve 12 (operation (d)), remaining unburned fuel is emitted quickly via the exhaust valve 12. That is, it allows the exhaust gas to be emitted when temperature within the cylinder is around its peak. Because the air-fuel ratio is controlled at slightly lean value (operation (a)), oxygen necessary for the post-burning of the unburned fuel is emitted to the exhaust pipe 3 from the cylinder together with the hot exhaust gas to be burned within the exhaust pipe 3 under such various conditions. Here, because the temperature of the exhaust gas emitted via the exhaust valve 12 after being burned within the cylinder is about 700° C. or more at which gasoline fuel ignites by itself, the most of the unburned fuel (unburned HC) is burned during the post-burning. Accordingly, a quantity of HC fed to the catalyst converters 13 and 14 before the activation as the unburned fuel (unburned HC) is very small.

The exhaust gas temperature is kept at high temperature by causing the post-burning within the exhaust pipe 3. Then, the catalyst converters 13 and 14 in the cold state may be activated quickly by feeding the hot exhaust gas to the catalyst converters 13 and 14. It is noted that the starting stability of the engine 1 may be assured by executing the above operations (a) through (d) after completing the starting. That is, the operations (a) through (d) are executed after when an engine speed reaches a predetermined speed, e.g., 700 rpm, which is considered to be the completion of the starting, after starting the engine cranking.

Various computing processes executed by the CPU 31 within the ECU 30 to realize the above respective operations (a) through (d) will be explained below by using flow diagrams in FIGS. 2 through 4.

Figure 2:
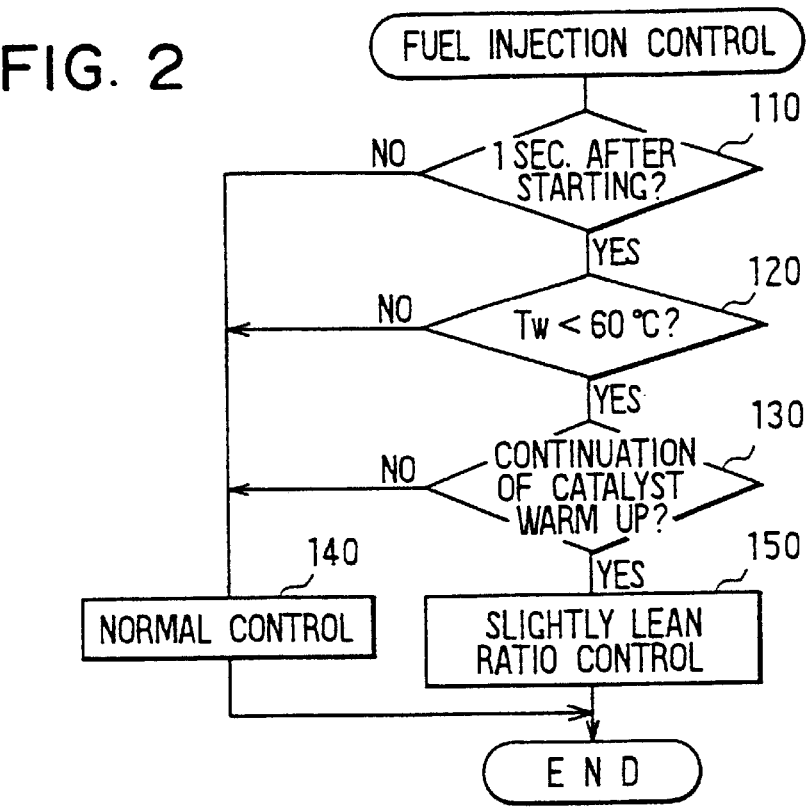
FIG. 2 is a flow diagram showing a process for controlling fuel injection.

At first, in FIG. 2 showing a process for controlling fuel injection, this process is started by the CPU 31 per every fuel injection (per 120° CA in case of a six-cylinder engine) for example.

The CPU 31 determines at Step 110 whether or not a predetermined time, e.g., 1 second or more, has elapsed after the completion of starting. It is determined to be YES at Step 110 when the engine speed Ne has reached 700 rpm or more and 1 second has elapsed in the state where Ne≧700 rpm, for example.

The CPU 31 also determines at Step 120 whether or not the engine coolant temperature Tw is below predetermined temperature (60° C.). This step is carried out to determine whether it is necessary to warm up the catalysts. It is determined to be NO at Step 120 when the engine 1 is started again at high temperature, for example.

The CPU 31 also determines whether or not to continue to warm up the catalysts at Step 130. Specifically, it determines whether or not 20 seconds has elapsed from the start of cranking or the engine has entered a non-idling state. Then, when 20 seconds has elapsed from the start of cranking or the engine has entered the non-idling state, the CPU 31 determines that it is not necessary to warm up the catalysts and to be NO at Step 130.

When any of the above Step 110 through 130 is determined to be NO, the CPU 31 advances to Step 140 to implement the fuel injection control of the normal time. Here, the CPU 31 implements the known fuel injection control in the starting time such as increment and correction of warm up corresponding to the engine coolant temperature Tw at the beginning of the start of the engine 1. It also implements the known air-fuel ratio feedback control after completing to warm up the engine 1. That is, the CPU 31 corrects the air-fuel ratio based on a result of the air-fuel ratio detected by the A/F sensor 15 with respect to a basic injection amount corresponding to the engine operating conditions (Ne, Qa). At this time, the air-fuel ratio is controlled in feedback in accordance with a control algorithm such as advanced control or PID control, for example.

Meanwhile, when the CPU 31 determines to be YES in all of the Step 110 through 130, it advances to Step 150 to control the air-fuel ratio at the slightly lean ratio, e.g., A/F=16 which is leaner in fuel than stoichiometric ratio A/F=14.7). While the fuel injection amount may be controlled in open-loop while setting the slightly lean air-fuel ratio (A/F=16) at a target air-fuel ratio in this case, the control may be switched to the feedback control after when the A/F sensor 15 is activated.

Figure 3:
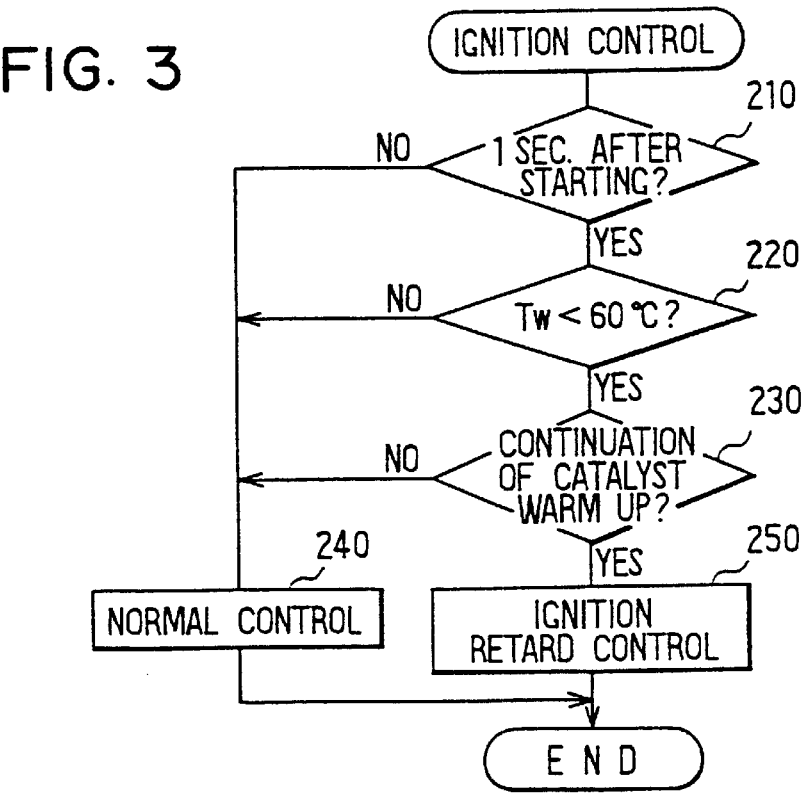
FIG. 3 is a flow diagram showing a process for controlling ignition timing.

In FIG. 3 showing a process for controlling ignition timing, this process is started by the CPU 31 per every fuel injection of each cylinder (every 120° CA in case of the 6-cylinder engine) for example.

The CPU 31 determines whether or not to implement the ignition timing control to warm up the catalysts at Step 210 through 230. Because the processes at Steps 210 through 230 are the same with the above processes of Steps 110 through 130 in FIG. 2, their detailed explanation will be omitted here. They may be summarized as follows:

Determine whether or not a predetermined time, e.g., one second or more, has elapsed after completing the start at Step 210;

Determine whether or not the engine coolant temperature Tw is below predetermined temperature (60° C.) at Step 220; and Determine whether or not to continue to warm up the catalysts at Step 230.

When any of the Steps 210 through 230 is determined to be NO, the CPU 31 advances to Step 240 to implement the ignition timing control of the normal time. Here, the CPU 31 fixes the ignition timing at 5° CA before compression TDC (BTDC) for example at the beginning of the start of the engine 1. It controls the ignition timing by an optimum value of advancement by making idling stabilization correction and knock advancement correction with respect to the basic angle of advancement corresponding to the engine operating conditions (Ne, Qa).

Meanwhile, when all of the Steps 210 through 230 are determined to be YES, the CPU 31 advances to Step 250 to retard the ignition timing by a predetermined amount. In the present embodiment, the ignition timing is set at 10° CA after the compression TDC (ATDC).

Figure 4:
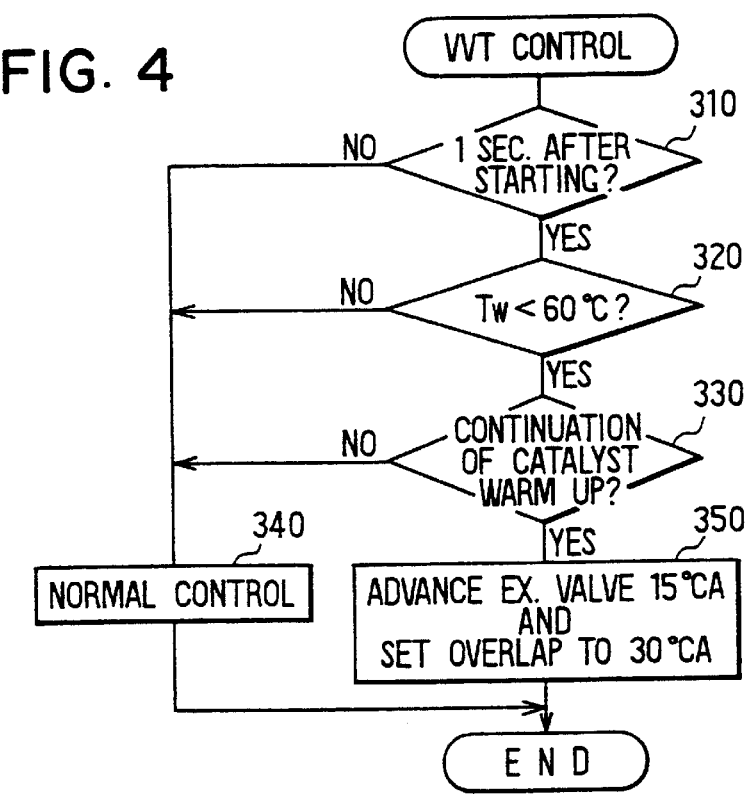
FIG. 4 is a flow diagram showing a VVT control process.

In FIG. 4 showing a VVT control process, this process is started by the CPU 31 with a cycle of 64 ms for example. The CPU 31 determines the condition whether or not to implement the VTT control to warm up the catalysts at Steps 310 through 330. Because the processes at Steps 310 through 330 are the same with the processes of Steps 110 through 130 in FIG. 2, their detailed explanation will be omitted here. They may be summarized as follows:

Determine whether or not a predetermined time, e.g., one second or more, has elapsed after completing the start at Step 310;

Determine whether or not the engine coolant temperature Tw is below predetermined temperature (60° C.) at Step 320; and Determine whether or not to continue to warm up the catalysts at Step 330.

When any of the Steps 310 through 330 is determined to be NO, the CPU 31 advances to Step 340 to implement the VVT control of the normal time. Here, the CPU 31 controls opening/closing timing of the intake valve 11 and the exhaust valve 12 at the most retarded position at the beginning of the starting of the engine 1. It implements the known VVT feedback control after completing to warm up the engine 1. That is, a target advancement of the intake side valve timing is set corresponding to the engine operating conditions (Ne, Qa) and the drive of the intake side VVT mechanism 23 is controlled in feedback so that the target advancement agrees with a result detected by the cam position sensor 25.

Meanwhile, when all of the Steps 310 through 330 are determined to be YES, the CPU 31 advances to Step 350 to advance the opening/closing timing of the exhaust valve 12 by 15° CA to set a valve opening overlap of the intake valve 11 and the exhaust valve 12 to 30° CA.

Figure 5:
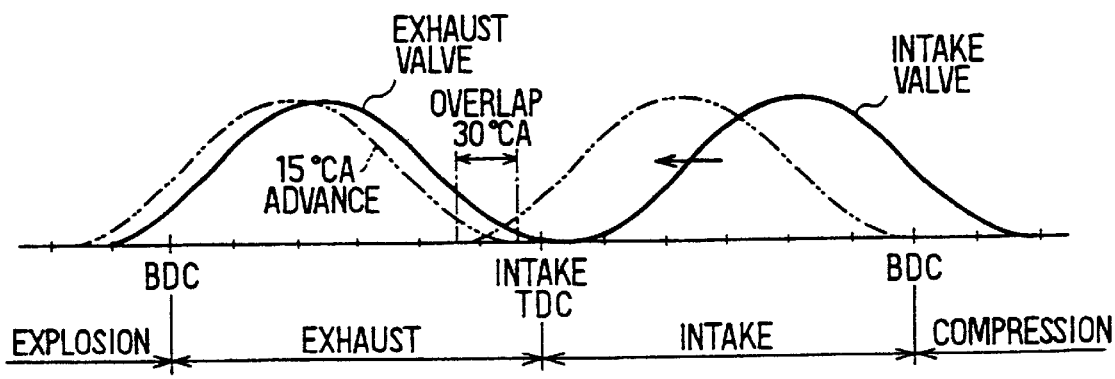
FIG. 5 is a graph showing opening and closing operations of an intake valve and an exhaust valve.

The operation in controlling the valve timing is shown in FIG. 5. The exhaust valve 12 opens before the exhaust BDC and closes right after the intake TDC when the VVT control amount=0 as indicated by a solid line in the figure. The intake valve 11 opens after the intake TDC and closes after the intake BDC. At this time, the valve opening overlap is 0. Meanwhile, according to the process at Step 350 in FIG. 4, the opening/closing timing of the exhaust valve 12 shifts to the advance side by 15° CA as indicated by a two-dot chain line. The intake valve 11 is also controlled to the advance side and the valve opening overlap of the intake valve 11 and the exhaust valve 12 turns out to be 30° CA.

Next, a result of tests carried out to confirm the effect of the present embodiment will be explained by using FIGS. 6 through 8. It is noted that all of the following data is those attained under the same conditions of Ne=1200 rpm, Tw=20° C. and ignition retard angle=ATDC 10° CA.

Figure 6:
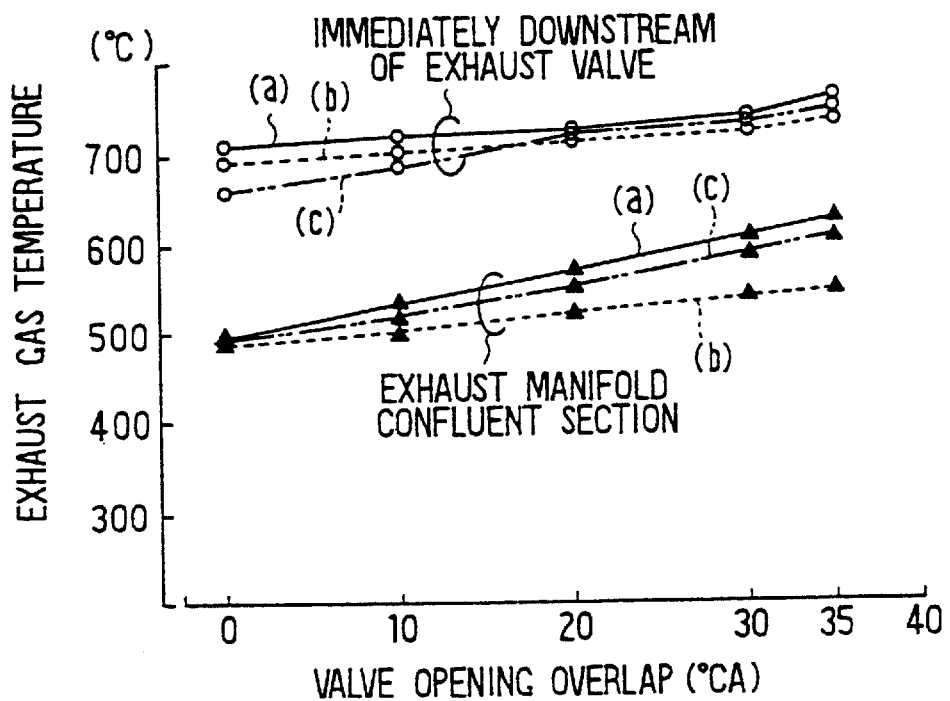
FIG. 6 is a graph showing the relationship between a valve opening overlap and exhaust gas temperature.

FIG. 6 is a graph showing the relationship between the valve opening overlap amount of the intake and exhaust valves and exhaust gas temperature. FIG. 7 is a graph showing the relationship between the valve opening overlap amount and HC concentration within exhaust gas in a confluent section of the exhaust manifold (at the position downstream of the exhaust valve by about 900 mm). In FIGS. 6 and 7, the data discriminated by a solid line, a dot line and a two-dot chain line indicate those in which the advancement of the exhaust valve 12 is set respectively at:

(a) 15° CA, (b) 0° CA, and (c) 30° CA.

Further, the data plotted by round marks in FIG. 6 indicate temperature data immediately downstream the exhaust valve and the data plotted by black triangle marks indicate data at the confluent section of the exhaust manifold (at the position downstream of the exhaust valve by about 900 mm).

As it is apparent from FIG. 6, the exhaust gas temperature is kept at high temperature by advancing the exhaust valve 12 by 15° CA (FIG. 6A) as compared with the case when it is advanced by 0° CA or 30° CA. The exhaust gas temperature is low when the exhaust valve 12 is advanced by 30° CA as compared with the case of when it is advanced by 15° CA even though the similar advancement control is made. It is considered to happen because the post-burning of the unburned HC becomes inefficient because the advancement of the exhaust valve is too large.

Considering the relationship between the valve opening overlap and the exhaust gas temperature, the larger the valve opening overlap, the higher the exhaust gas temperature becomes. It is considered to happen because the internal EGR amount increases and an amount of post-burning of the unburned HC increases by increasing the valve opening overlap. Considering that the activation of the catalysts may be realized by holding the exhaust gas temperature at the inlet of the catalysts (at the position downstream of the exhaust valve by about 300 mm) at a predetermined temperature range (around 600 to 700° C.), the valve opening overlap is considered to be desirable to be around 20° CA or more.

Figure 7:
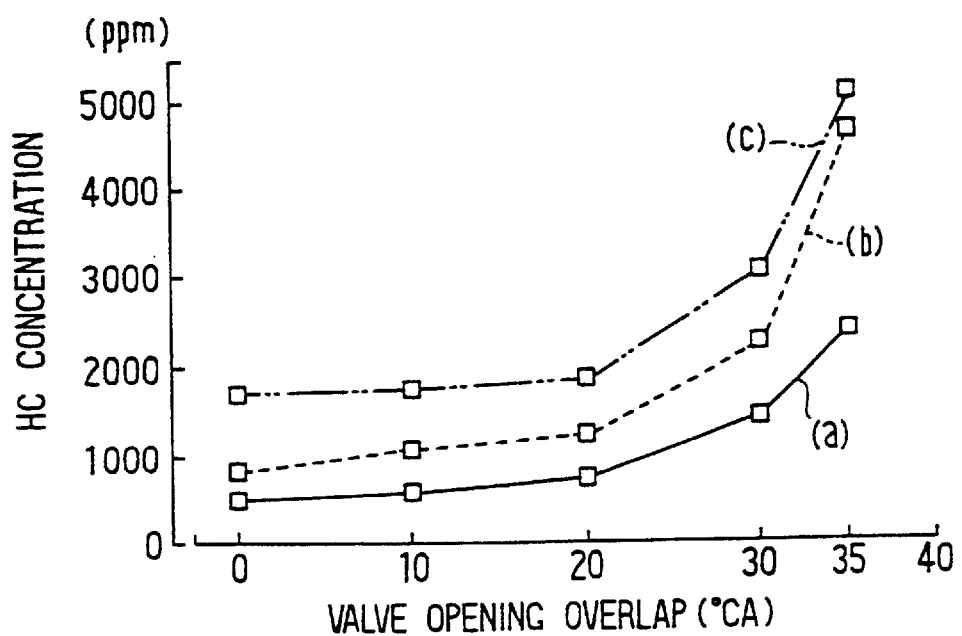
FIG. 7 is a graph showing the relationship between the valve opening overlap and HC concentration.

Meanwhile, as it is apparent from FIG. 7, the HC concentration at the confluent section of the exhaust manifold becomes small by advancing the exhaust valve 12 by 15° CA ((a) in FIG. 7) as compared with the case when it is advanced by 0° CA or 30° CA ((b) and (c) in FIG. 7). The small HC concentration at the confluent section of the exhaust manifold means that the unburned HC within the exhaust gas has been burned efficiently by the post-burning. Considering also about the relationship between the valve opening overlap and the HC concentration, the larger the valve opening overlap, the larger the HC concentration becomes. It may be understood here that the emission of the unburned HC may be suppressed by setting the valve opening overlap at around 30° CA at maximum.

Figure 8:
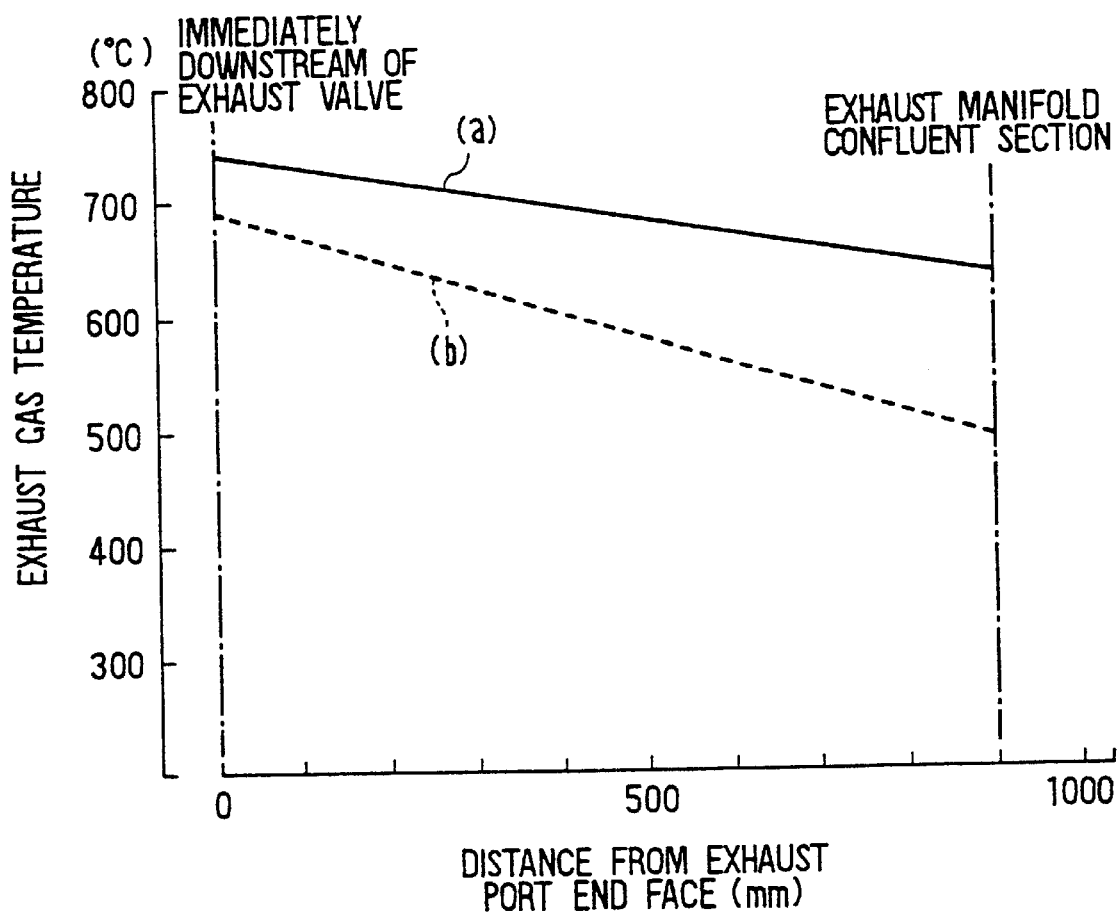
FIG. 8 is a graph showing the relationship between a distance from an end face of an engine exhaust port and the exhaust gas temperature.

FIG. 8 is a graph showing the relationship between a distance from the end face of the engine exhaust port and the exhaust gas temperature. In the figure, a solid line (a) and a dotted line (b) indicate, respectively:

(a) test data of the present embodiment attained under the conditions of valve opening overlap=30° CA, exhaust valve advancement=15° CA and A/F=16; and (b) test data attained under the conditions of valve opening overlap=0° CA, exhaust valve advancement=0° CA and A/F=14.7 (stoichiometric).

It is apparent from FIG. 8 that exhaust gas temperature indicated by (a) is higher than exhaust gas temperature indicated by (b) at any position within the exhaust pipe (exhaust manifold) and that a gradient of drop of the temperature of the exhaust gas temperature indicated by (a) is smaller. It is considered to happen because the post-burning within the exhaust pipe is carried out efficiently and thereby, the exhaust gas flows to the downstream side of the exhaust pipe while being maintained at high temperature.

The present embodiment provides the following effects.

(1) Because the VVT mechanisms 23 and 24 are manipulated and the valve opening overlap of the intake valve 11 and the exhaust valve 12 is controlled to a predetermined amount (around 30° CA) in starting the engine 1 in the cold state, the post-burning occurs within the exhaust pipe 3 and the exhaust gas temperature is kept at high temperature. As a result, the catalyst converters 13 and 14 in the cold state are activated quickly;

(2) Because the valve opening overlap of the intake valve 11 and the exhaust valve 12 is set to 30° CA, the HC concentration of the unburned gas emitted out of the cylinder increases and the effect of the internal EGR may be attained reliably. In this case, the exhaust gas temperature is kept in the desirable temperature range for activating the catalysts and an amount of unburned HC emitted to the air is suppressed to a minimum as the post-burning is carried out (FIGS. 6 and 7);

(3) In addition to the control of the valve opening overlap, the control of the retardation of the ignition timing, the control of the air-fuel ratio to the slightly lean ratio and the control of the advancement of the exhaust valve 12 are carried out in starting the engine 1 in the cold state. The effect of keeping the exhaust gas temperature high by the post-burning may be realized more reliably by carrying out these controls in combination;

(4) The exhaust gas may be emitted around the peak of the cylinder inner temperature and the post-burning may be carried out efficiently because the valve opening timing of the exhaust valve 12 is advanced by 15° CA; and (5) various controls when the engine is cold including the valve timing control are prohibited during the predetermined period of time until when the starting of the engine 1 is completed. That is, each of the above controls are not made until when the engine speed reaches a predetermined number of revolutions which is considered to be the completion of the engine start after starting cranking to give priority to the stabilization of the start. The controls are executed after the completion of the start.

(Second Embodiment)

In the second embodiment, it is noted that parts in the structure of the second embodiment which are equivalent to those in the first embodiment described above are denoted by the same reference numerals and their explanation will be simplified.

The valve opening overlap of the intake and exhaust valves is increased thereby to effect the post-burning within the exhaust pipe in order to activate (warm up) the catalyst converters quickly in starting the engine in the cold state in the first embodiment. In this embodiment, however, the ignition timing is controlled to the retard side to activate (warm up) the catalyst converters quickly, and fluctuation of torque which is liable to occur in retarding the ignition timing is suppressed further by conducting a plurality of igniting operations per one burning stroke, i.e., by carrying out a multiple ignition.

Noting that burning velocity within the cylinder may be controlled by retarding the ignition timing, exhaust gas temperature when the exhaust valve is opened is set at a desirable temperature by the control of the burning velocity. Then, the catalyst converters are activated quickly by such control of burning velocity.

Figure 9:
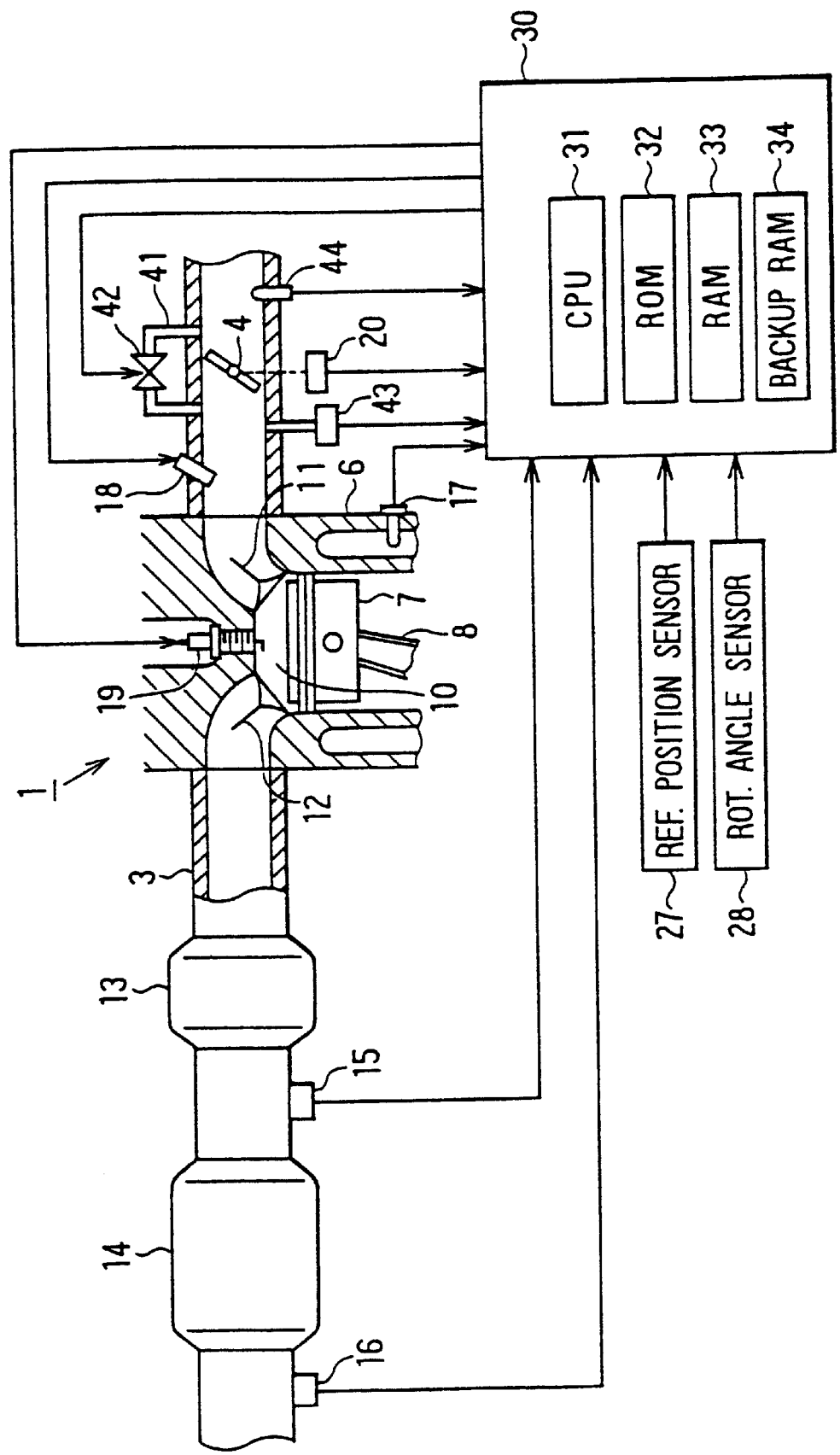
FIG. 9 is a schematic view showing a catalyst activation control system according to a second embodiment of the invention.

In FIG. 9 showing the second embodiment, the intake and exhaust side VVT mechanisms 23 and 24 are eliminated. A bypass passage 41 is provided so as to detour the throttle valve 4 and an ISC valve (idling speed control valve) 42 is disposed in the bypass passage 41. When the engine 1 is started in the cold state for example, the ISC valve 42 is controlled to a desired angle to increase an amount of air bypassing the throttle valve 4 in order to rotate the engine 1 smoothly. An intake pressure sensor 43 for detecting pressure within the intake pipe (intake pipe pressure PM) and an intake temperature sensor 44 for detecting temperature of intake air (intake air temperature Ta) are provided in the intake pipe 2 instead of the airflow meter 5 used in the first embodiment.

Next, operations of the control system will be explained. In controlling ignition timing, a retardation correcting value θRE of the ignition timing is determined and the basic ignition timing θBSE is retarded by θRE when the conditions for warming up the catalysts hold. At this time, multiple ignition is implemented together in order to suppress the fluctuation of torque. Further, the air-fuel ratio is set at the stoichiometric or slightly lean ratio when the conditions for warming up the catalysts 13 and 14 hold in the same manner. Whether the conditions for warming up the catalysts 13 and 14 hold or not is determined by making reference to a catalyst warm-up execution flag XCAT. The flag XCAT is controlled by processes shown in FIG. 10. Here, XCAT=1 indicates that the implementation conditions hold and XCAT=0 indicates that the implementation conditions do not hold.

Figure 10:
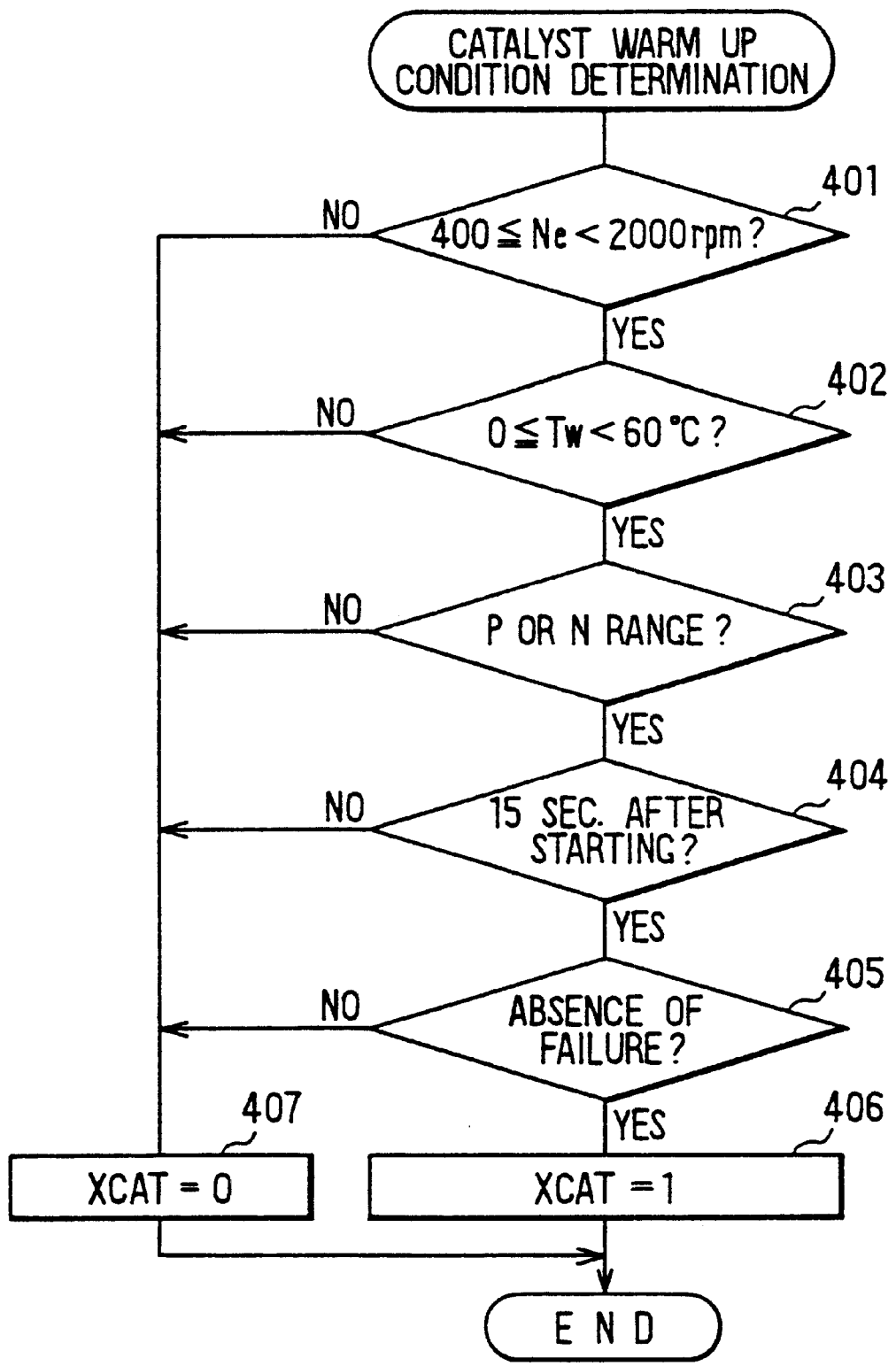
FIG. 10 is a flow diagram showing a process for determining conditions for warming up a catalyst.

The process in FIG. 10 are executed by the CPU 31 at a predetermined cycle, e.g., every 10 ms. In the processes, to the CPU 31 determines:

whether or not the engine speed Ne is 400 to 2000 rpm at Step 401;

whether or not the engine coolant temperature Tw is 0 to 60° C. at Step 402;

whether or not a gear shift position of an automatic transmission of a vehicle is P or N range (neutral in case of a manual transmission) at Step 403;

whether or not it is within 15 seconds after completing the start of the engine 1 at Step 404; and whether or not various failures has occurred at Step 405.

Then, when they are determined to be all YES in the above Steps 401 through 405, the CPU 31 sets the catalyst warm-up execution flag XCAT at 1 at Step 406 in order to allow the process for warming up the catalysts to be executed. However, when any one of them is NO at Step 401 through 405, the CPU 31 clears the catalyst warm-up execution flag XCAT to 0 in order to prohibit the execution of the process for warming up the catalysts at Step 407.

Next, a process for controlling the ignition timing in the present embodiment will be explained in accordance with the flow diagram in FIG. 11. It is noted that the processes of FIG. 11 is executed by the CPU 31 at a predetermined cycle, e.g., every 10 ms.

Figure 11:
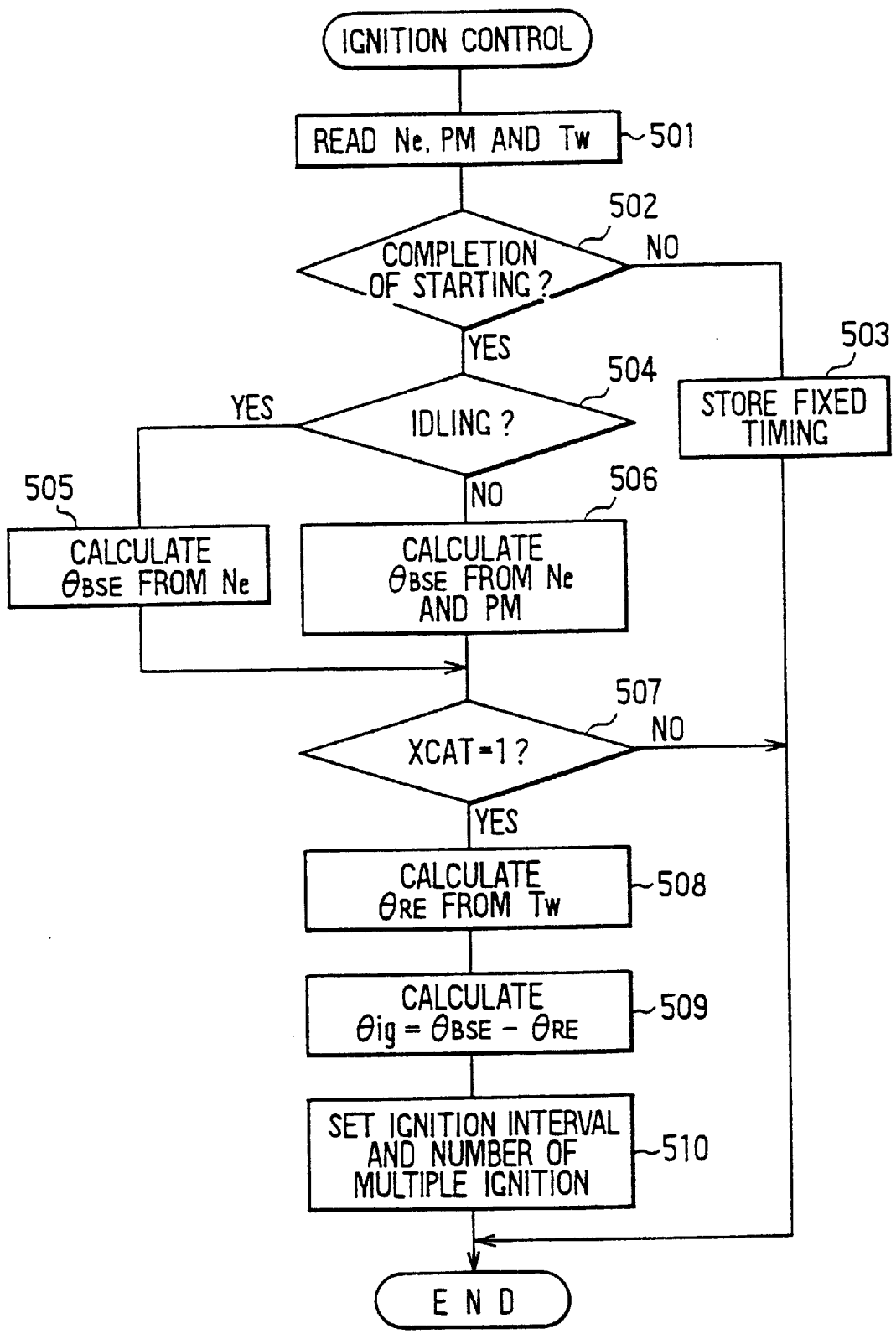
FIG. 11 is a flow diagram showing a process for controlling ignition timing.

In FIG. 11, the CPU 31 reads the engine speed Ne, the intake pipe pressure PM, the engine coolant temperature Tw and others at Step 501 and determines whether or not the start of the engine has been completed at the present moment at Step 502. When the engine speed Ne at that time is 400 rpm or more for example, the CPU 31 determines that the engine starting has been completed (YES at Step 502).

When it is the moment before the completion of the start of the engine, the CPU 31 advances to Step 503 to store fixed ignition timing, e.g., BTDC 5° CA, set in advance to a predetermined address and ends the routine once.

When it is the moment after the completion of the start of the engine, the CPU 31 advances to Step 504 to determine whether or not the throttle is totally closed, i.e., idling or not, based on an output of the throttle sensor 20. When it is an idling time, the CPU 31 advances to Step 505 to calculate the basic ignition timing θBSE corresponding to the engine speed Ne at that time. When it is not the idling time, the CPU 31 advances to Step 506 to calculate the basic ignition timing θBSE corresponding to the engine speed Ne and the intake pipe pressure PM at that time by using a map stored in advance in the ROM 32. The higher the engine speed Ne is, the further to the advance side the basic ignition timing θBSE is set in general. It is noted that the basic ignition timing θBSE is set normally around BTDC 10 CA for example at the beginning of the start of the engine.

After that, the CPU 31 determines whether or not the catalyst warm-up execution flag XCAT is 1. When XCAT=1, the CPU 31 executes the ignition timing control for warming up the catalysts in the following Steps 508 through 510. When XCAT=0, the CPU 31 ends the routine as it is.

Figure 14:
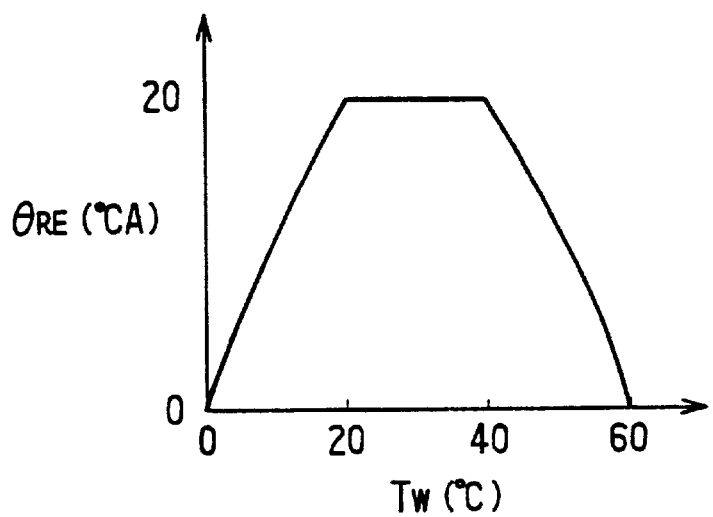
FIG. 14 is a graph for setting a retardation correction value.

Specifically, the CPU 31 calculates the retardation correction value θRE for warming up the catalysts at Step 508 corresponding to the engine coolant temperature Tw at each moment by using a characteristic graph shown in FIG. 14. According to the characteristic graph in FIG. 14, the retardation correction value θRE is set in a range of 0 through 20° CA corresponding to the engine coolant temperature Tw. More specifically, the higher the temperature Tw is, the greater the retardation correction value θRE becomes in the range Tw=0 through 20° C. and the retardation correction value θRE becomes constant in a range Tw=20 to 40° C. Further, the higher the temperature Tw is, the smaller the retardation correction value θRE becomes in a range Tw=40 through 60° C.

After that, the CPU 31 subtracts the retardation correction value θRE from the basic ignition timing θBSE calculated before at Step 509 (θig=θBSE−θRE) and stores that value in a predetermined address as a new ignition timing, thus ending the routine.

Figure 15:
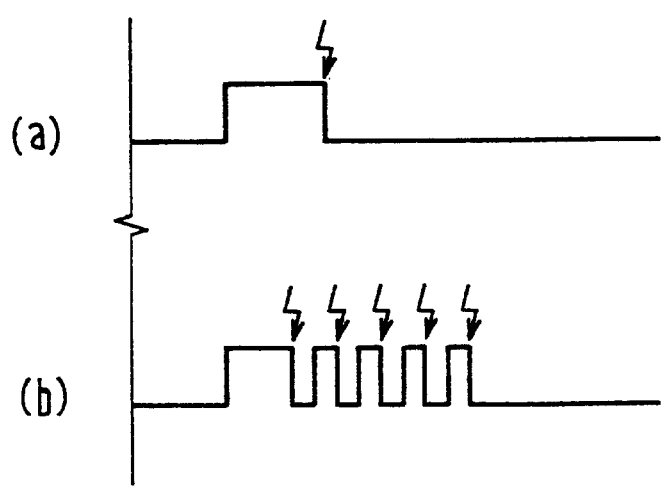
FIG. 15 is a signal waveform diagram showing modes of multiple ignition.

Then, the CPU 31 advances to Step 510 to set ignition interval and ignition number of times in the multiple ignition corresponding to various parameters. As shown in FIG. 15, while one pulse signal is outputted per one combustion stroke in case of the normal signal, a plurality of pulse signals are outputted per one combustion stroke in case of the signal (b).

Figure 16A:
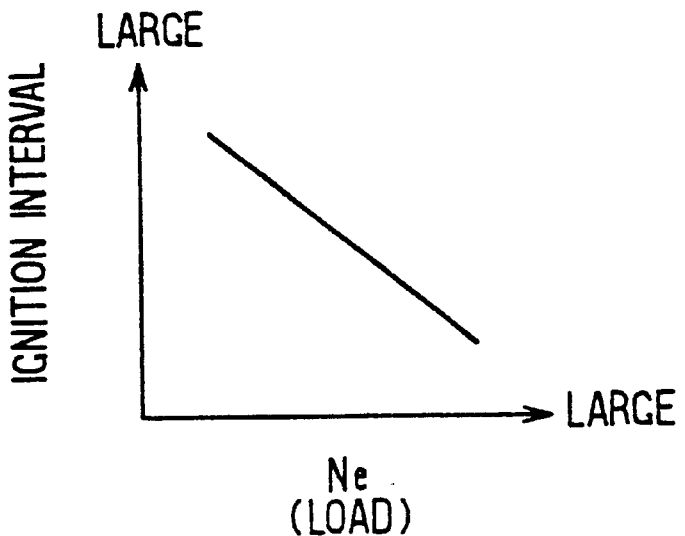
FIGS. 16A and 16B are graphs for setting ignition intervals of the multiple ignition.
Figure 16B:
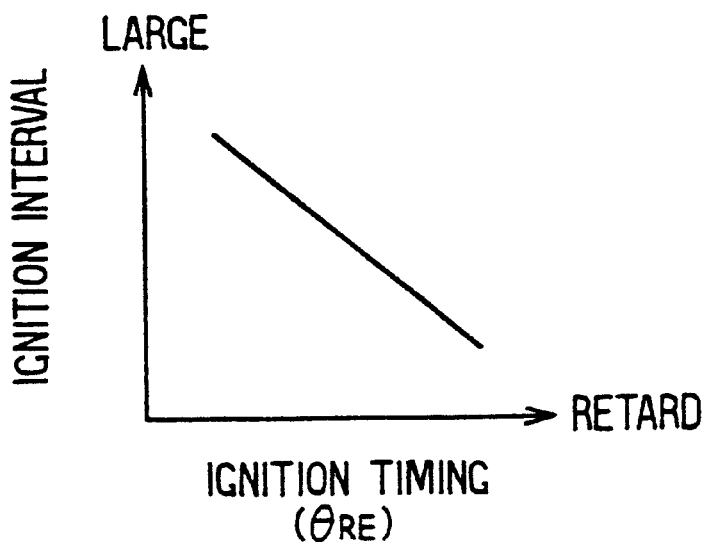
Figure 17A:
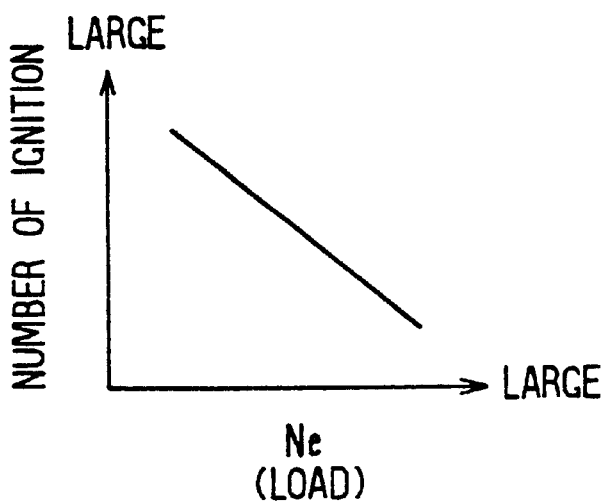
FIG. 17A through 17C are graphs for setting ignition number of times of the multiple ignition.
Figure 17B:
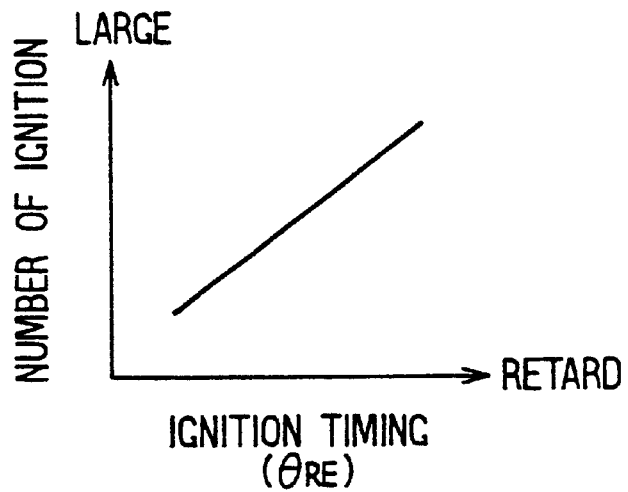
Figure 17C:
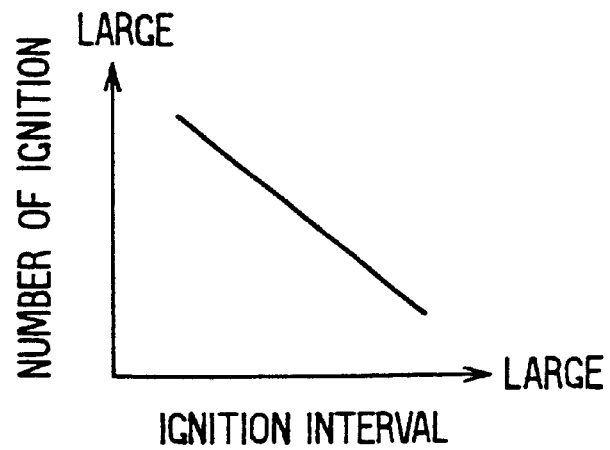

It is essential to obtain firing of each ignition and dispersion of each flame in the multiple ignition, presupposing that, the ignition interval and the ignition number of times are set in accordance with burning conditions at each time. Here, the ignition interval of the multiple ignition may be set variably at a value between 0.5 ms to 1.5 ms and the ignition number of times at a value from two to ten times. More specifically, the ignition interval is set by using at least one of relationship in FIGS. 16A and 16B and corresponding to each parameter such as the engine speed Ne or engine load and the ignition timing (retardation correction value θRE) represented by the horizontal axis. However, when the ignition interval set in FIG. 16A is different from that in FIG. 16B, one having a greater value is selected. Further, the ignition number of times is set by using at least one of relationships in FIGS. 17A, 17B and 17C and corresponding to each parameter such as the engine speed Ne or engine load, the ignition timing (retardation correction value θRE) and the ignition interval represented by the horizontal axis. However, when the ignition number of times set in FIGS. 17A, 17B and 17C are different from each other, one having a greater value is selected. The intake pipe pressure PM or the intake air amount Qa may be used as the engine load.

Figure 12:
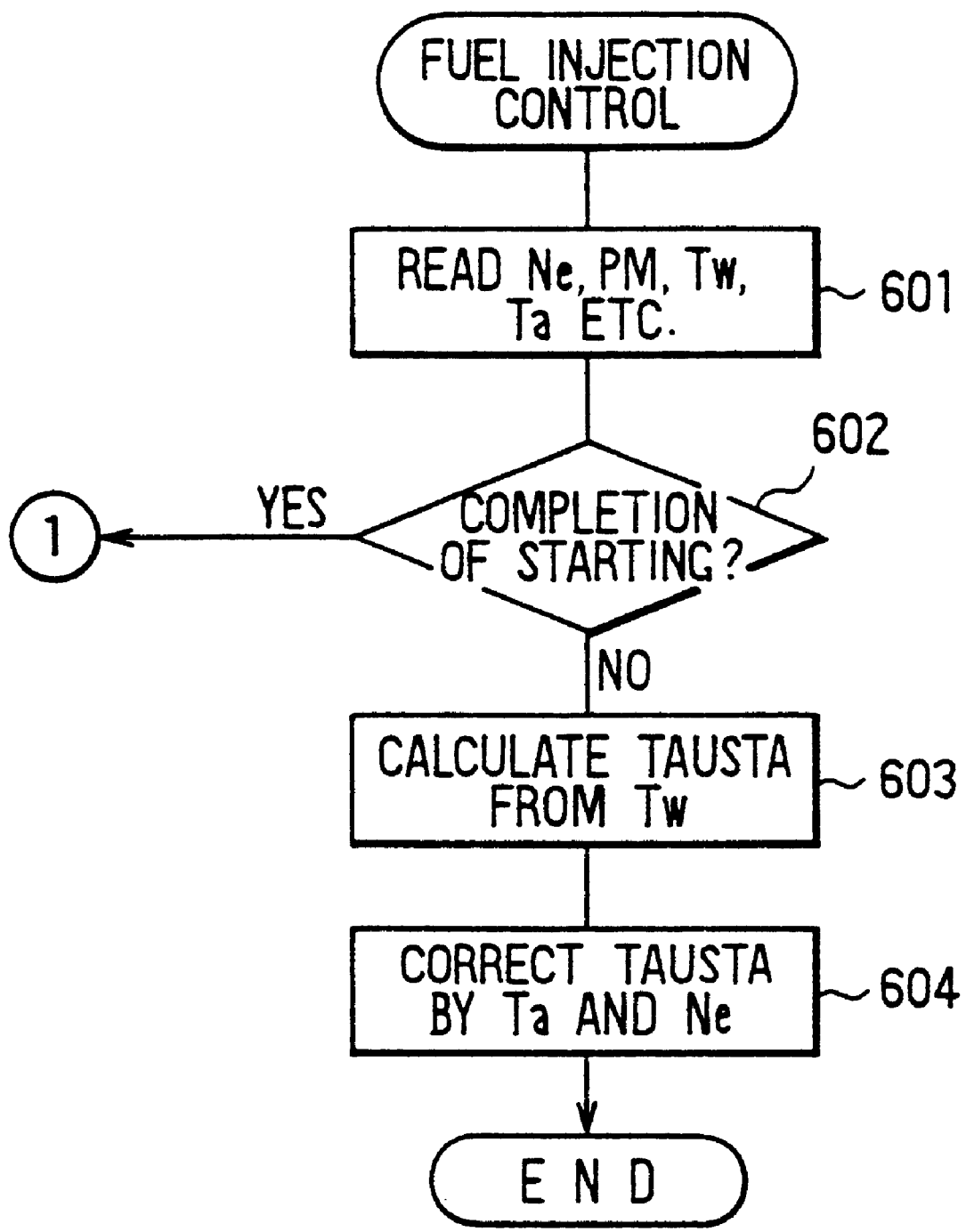
FIG. 12 is a flow diagram showing a part of process for controlling fuel injection.
Figure 13:
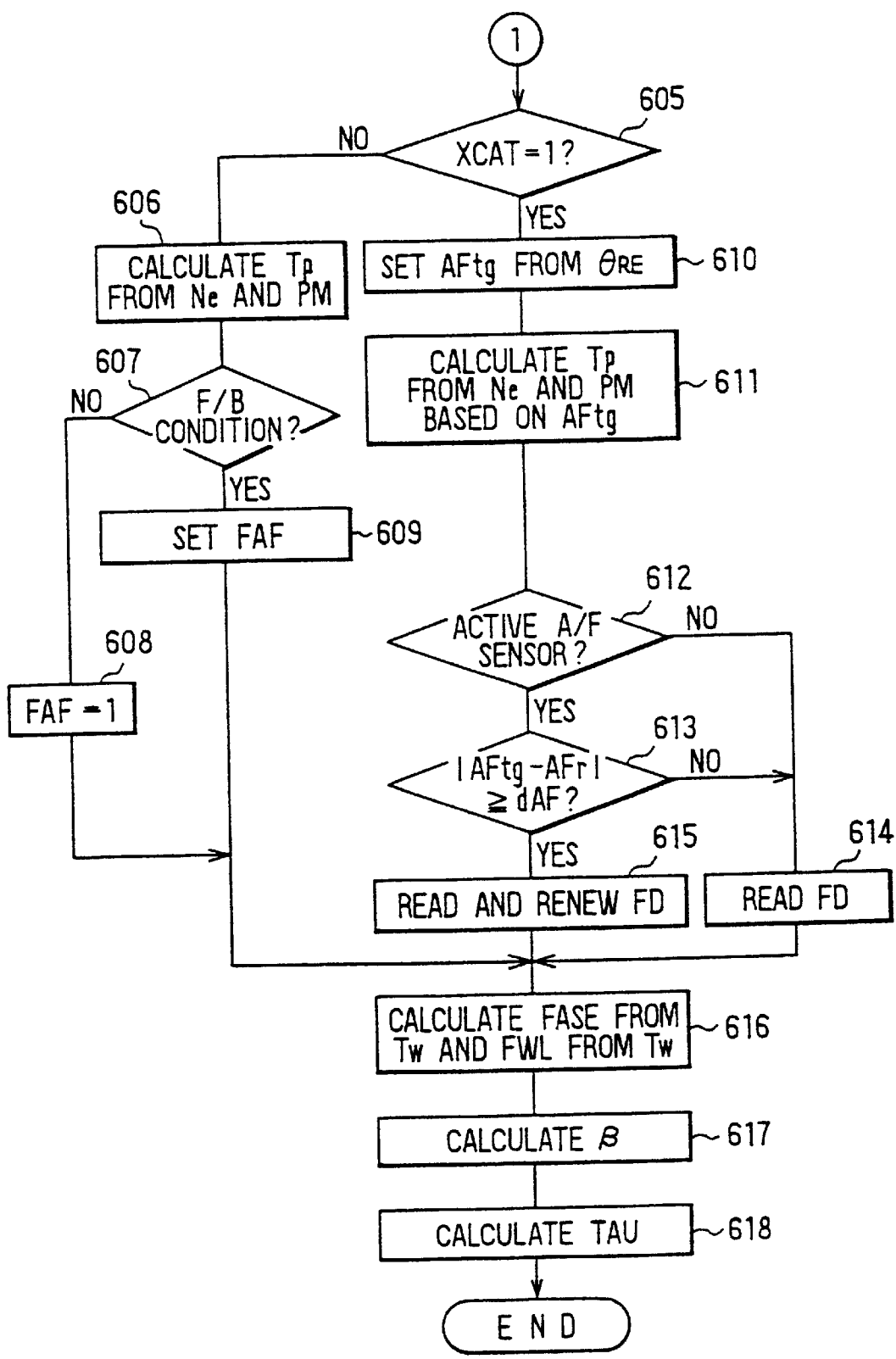
FIG. 13 is a flow diagram showing another part of the process for controlling the fuel injection.

In FIGS. 12 and 13 showing a process for controlling fuel injection, it is noted that the processes in FIGS. 12 and 13 are executed by the CPU 31 with a predetermined cycle, e.g., every 10 ms.

At first, the CPU 31 reads the engine speed Ne, the intake pipe pressure PM, the engine coolant temperature Tw, the intake air temperature Ta and others at Step 601, and determines whether or not the engine start has been completed at Step 602. When the engine start has not been completed, the CPU 31 advances to Step 603 to calculate a starting time injection amount TAUSTA corresponding to the engine coolant temperature Tw. Here, the lower the engine coolant temperature, the greater the value of the starting time injection amount TAUSTA becomes. Then, the CPU 31 corrects the starting time injection amount TAUSTA by the intake air temperature Ta, the engine speed Ne and others at Step 604, thus ending the routine once.

When it is YES at Step 602 as the starting has been completed, the CPU 31 advances to Step 605 in FIG. 13 to determine whether or not the catalyst warm-up execution flag XCAT is 1. When XCAT=0, the CPU 31 executes the normal fuel injection control in the following Steps 606 through 609. When XCAT=1, the CPU 31 executes the fuel injection control to warm up the catalysts in the following Steps 610 through 616.

That is, when XCAT=0, the CPU 31 calculates a basic injection amount Tp by using a normal map and corresponding to the engine speed Ne and the intake pipe pressure PM at that moment at Step 606. Further, the CPU 31 determines whether or not the known conditions of air-fuel ratio feedback (F/B) holds at Step 607. Here, the conditions of the air-fuel ratio F/B includes that the engine coolant temperature Tw is higher than predetermined temperature, the engine is not in high rotational and high load states and that the A/F sensor 15 is active.

When the F/B condition does not hold, the CPU 31 advances to Step 608 and sets a feedback correction factor FAF at 1.0. When the F/B condition holds, the CPU 31 advances to Step 609 to set the feedback correction factor FAF corresponding to a deviation between an actual air-fuel ratio AFr (output of the A/F sensor 15) and a target air-fuel ratio AFtg at that time. The known PID control method or advanced control method may be used in setting the value of FAF.

After calculating the value of FAF, the CPU 31 calculates a factor of increment after starting the engine FASE and a factor of increment of warm-up FWL corresponding to the engine coolant temperature Tw at Step 616 and calculates other correction factors β such as an increment of electrical load of an air-conditioner and the like at Step 617. Here, while fuel is incremented only by several tens seconds after starting the engine by the factor of increment after starting the engine FASE, fuel is incremented until when the engine coolant temperature Tw reaches a predetermined temperature by the factor of increment of warm-up FWL.

After that, the CPU 31 calculates a fuel injection amount TAU by correcting the basic injection amount Tp calculated before at Step 618 and ends the routine. When XCAT=0, the fuel injection amount TAU is calculated by using the following operational expression at Step 618 as described above;

$$TAU=Tp \cdot (1+FAD+FASE+FWL) \cdot \beta$$

Figure 18:
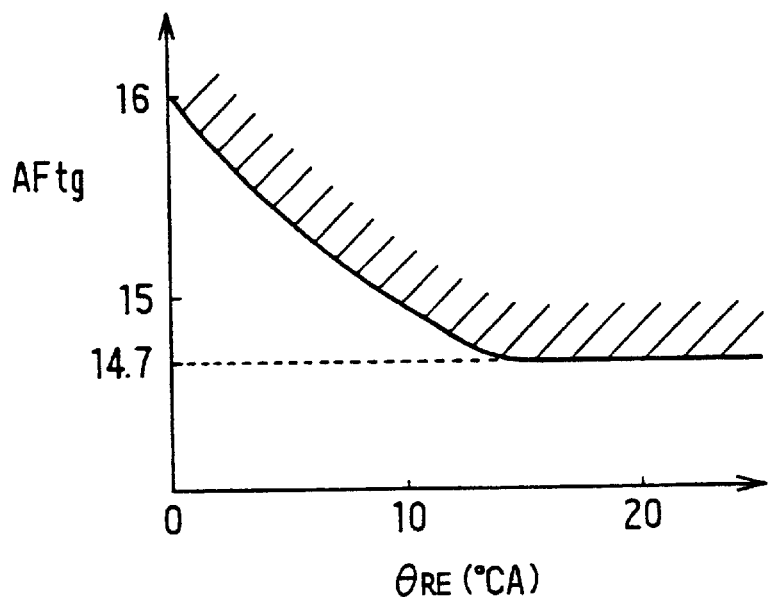
FIG. 18 is a graph for setting a target air-fuel ratio in warming up the catalyst.

Meanwhile, when XCAT=1 (when YES at Step 605), the CPU 31 advances to Step 610 to set the target air-fuel ratio AFtg in warming up the catalysts within a range of stoichiometric to slightly lean ratio ratio, e.g., in a range of A/F=14.7 through 16. Here, the target air-fuel ratio AFtg is set corresponding to the retardation correction value θRE calculated in FIG. 11. The relationship between the retardation correction value θRE and the target air-fuel ratio Aftg is shown in FIG. 18. The target air-fuel ratio AFtg may be set in an area of hatched lines in the figure. The greater the retardation correction value θRE is, the closer to the stoichiometric value the target air-fuel ratio AFtg is set. Specific numerical values in the present embodiment may be set as follows:

When θRE=0° CA, AFtg=16,
When θRE=5° CA, AFtg=15.5,
When θRE=10° CA, AFtg=15,
When θRE=15° CA, AFtg=14.7, and
When θRE=20° CA, AFtg=14.7.

That is, when the ignition retardation and the slightly lean air-fuel ratio are both implemented, the both of these controls become factors of controlling burning velocity within the cylinder, so that the burning velocity is controlled while comparing the both.

Thereafter, the CPU 31 calculates the basic injection amount Tp corresponding to the engine speed Ne and the intake pipe pressure PM at that moment by using a map per each target air-fuel ratio AFtg set in advance within the ROM 32 at Step 611.

The CPU 31 also determines whether or not the A/F sensor 15 is active at Step 612. For instance, when sensor temperature or sensor resistance of the A/F sensor 15 has reached an equivalent value indicating its active state, e.g., the sensor temperature=equivalent to 700° C., the CPU 31 determines that the A/F sensor 15 is active. Further, the CPU 31 determines whether or not an absolute value of the deviation between the target air-fuel ratio AFtg and the actual air-fuel ratio AFr is equal to or greater than a predetermined value dAF at Step 613.

When the result is NO at Step 612 or 613, the CPU 31 advances to Step 614 to read a correction value FD stored and held in the backup RAM 34 within the ECU 30 beforehand. The correction value FD eliminates control deviation of fuel injection amount in an open-loop control at the beginning of the start of the engine.

Figure 19:
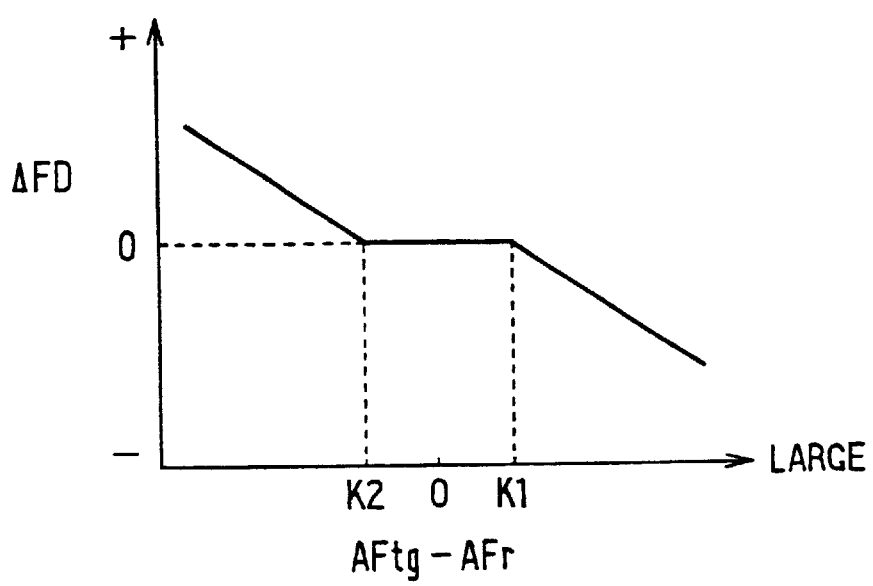
FIG. 19 is a graph for setting an update width $\Delta FD$ of the correction value.

When the result is YES in both Step 612 and 613, the CPU 31 advances to Step 615 to calculate the correction value FD corresponding to deviation of air-fuel ratio (AFtg–AFr) at that moment and update an existing value within the backup RAM 34 by the calculated correction value FD. That is, the CPU 31 finds an update width ΔFD by using the relationship in FIG. 19 for example and updates the existing correction value FD by ΔFD (sets as FD=FD+ΔFD). According to FIG. 19, when AFtg–AFr>K1, i.e., when the actual air-fuel ratio AFr is rich with respect to the target air-fuel ratio AFtg, minus ΔFD is found and when AFtg–AFr<K2, i.e., the actual air-fuel ratio AFr is lean with respect to the target air-fuel ratio AFtg, plus ΔFD is found.

After that, the CPU 31 calculates the factor of increment after starting the engine FASE and the factor of increment of warm-up FWL corresponding to the engine coolant temperature Tw at Step 616 and calculates other correction factors β such as an increment of electrical load of an air-conditioner at Step 617. Then, the CPU 31 calculates the fuel injection amount TAU by correcting the basic injection amount Tp calculated before in various ways at Step 618 and ends the routine. When XCAT=1, the fuel injection amount TAU is calculated by using the following operational expression at Step 618 as described above;

$$TAU=Tp \cdot (1+FD+FASE+FWL) \cdot \beta$$

Figure 20:
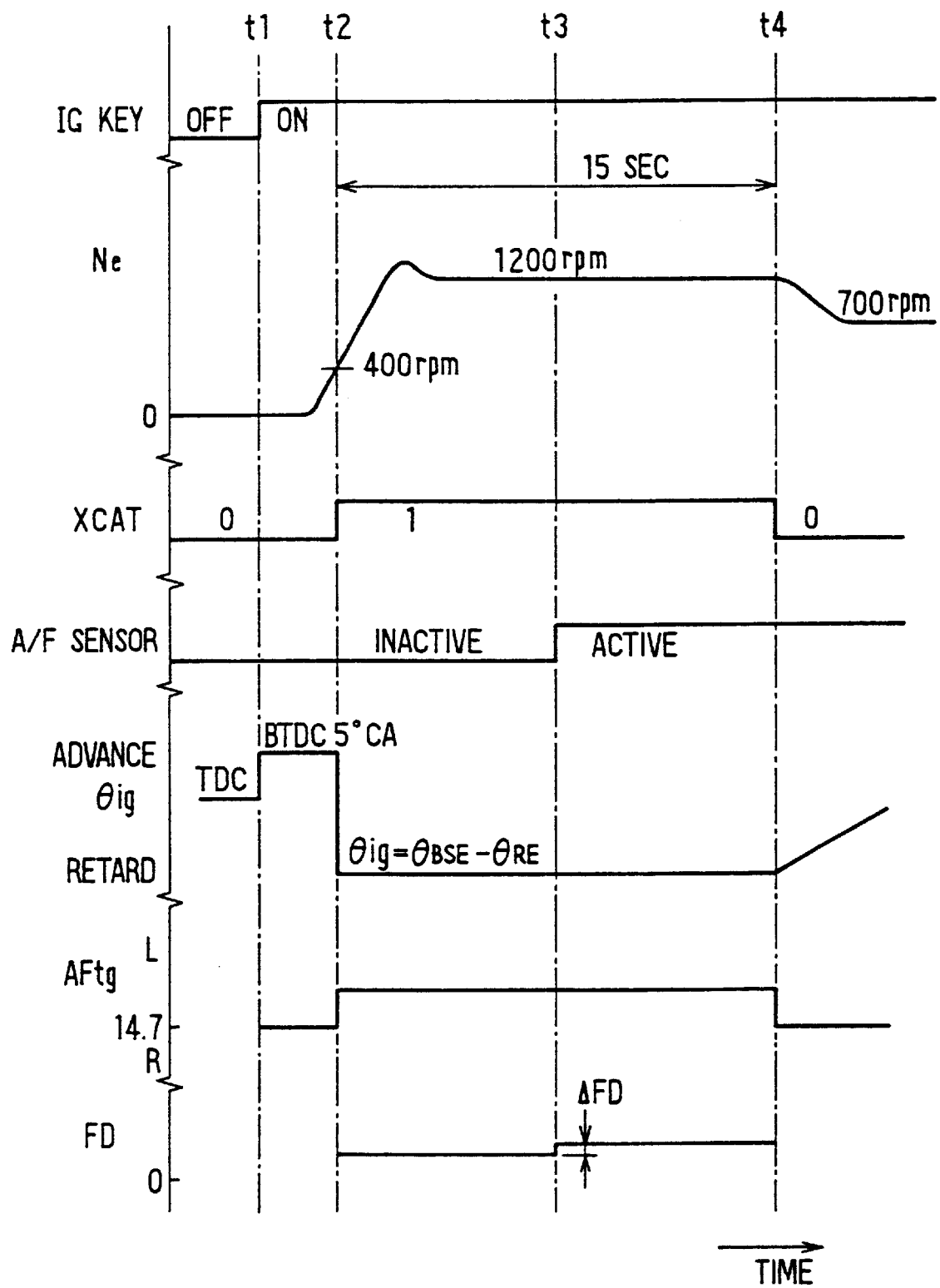
FIG. 20 is a timing diagram showing operations of the second embodiment.

FIG. 20 shows the states in which the processes for warming up the catalysts by the ignition retardation and the slightly leaning of the air-fuel ratio in starting the engine 1 in the cold state.

Here, when an ignition key is turned on at time t1 in FIG. 20, cranking is started by a starter motor (not shown). At this time, ignition timing is set at BTDC 5° CA (Step 503 in FIG. 11).

When the engine speed Ne reaches 400 rpm which indicates completion of the start and the conditions for warming up the catalysts all hold in the same time at time t2, the catalyst warm-up execution flag XCAT is set to 1 (Step 406 in FIG. 10). Then, the ignition timing θig is controlled so as to retard with respect to the basic ignition timing θBSE by the retardation correction value θRE on and after time t2 (Step 508 and 509 in FIG. 11). At the same time as the control for retarding the ignition, the multiple ignition is started (Step 510 in FIG. 11).

Still more, at time t2, the target air-fuel ratio AFtg is set within the range of stoichiometric to slightly lean ratio corresponding to the retardation correction value θRE at that moment (Step 610 in FIG. 13). Thereby, the quantity of oxygen in the exhaust gas increases. The correction value FD is also read from the backup RAM 34 and the fuel injection amount is corrected by the correction value FD (Step 614 in FIG. 13).

It is noted that the opening of the ISC valve 42 is adjusted and a quantity of air passing through the bypass passage 41 increases on and after time t2. That is, a fast idling process is implemented and the engine speed Ne is controlled to a predetermined starting time engine speed, e.g., 1200 rpm, which is higher than an idling engine speed, e.g., 700 rpm, after warming up.

Then, the A/F sensor 15 is determined to be active at time t3 (YES at Step 612 in FIG. 13). When the deviation of the air-fuel ratio at that moment is equal or greater than a predetermined value, the correction value FD is updated by ΔFD corresponding to the deviation of the air-fuel ratio (Step 615 in FIG. 13). The updated correction value FD is read from the backup RAM 34 in starting the engine in the next time and is used for correcting an injection amount. It allows the deviation of the control of the fuel injection amount to be eliminated at the beginning of start of the engine (before the sensor becomes active).

After that, when 15 seconds elapses from time t2 to time t4, the catalyst warm-up execution flag XCAT is cleared to 0 and along that, each process for warming up the catalysts is finished. That is, the ignition timing is advanced gradually on and after time t4. The correction of the injection amount by the correction value FD also ends and the target air-fuel ratio AFtg is changed to a target value corresponding to the engine operating state. Then, feedback control of the air-fuel ratio is started based on that target air-fuel ratio AFtg.

The burning velocity within the cylinder may be controlled and temperature of exhaust gas emitted from the exhaust valve 12 may be controlled by retarding the ignition timing and by slightly leaning the air-fuel ratio from time t2 to t4 as described above. That is, the high temperature exhaust gas is emitted to the exhaust pipe 3 by retarding the peak of the cylinder inner temperature and by opening the exhaust valve 12 at the timing around that peak. When the exhaust gas temperature is higher than temperature which enables post-burning within the exhaust pipe 3, the exhaust gas temperature rises further by the post-burning effect. As a result, the high temperature exhaust gas is sent to the catalyst converters 13 and 14 reliably, thus accelerating the quick activation of the catalyst converters 13 and 14.

It is noted that the A/F sensor 15 may be activated quickly and the actual air-fuel ratio may be detected quickly with the increase of the temperature of the exhaust gas described above. That is, the sensor may be activated within the processing period (time t2 to t4) for warming up the catalysts 13 and 14 as shown in FIG. 20.

Although fluctuation of torque is liable to occur because energy which is to be transformed originally into torque and the like within the cylinder is emitted to the exhaust pipe 3 in implementing the processes for warming up the catalysts 13 and 14 (control of burning velocity) by the ignition retardation and the slightly leaning of the air-fuel ratio described above, the fluctuation of torque may be suppressed by implementing the multiple ignition.

Figure 21:
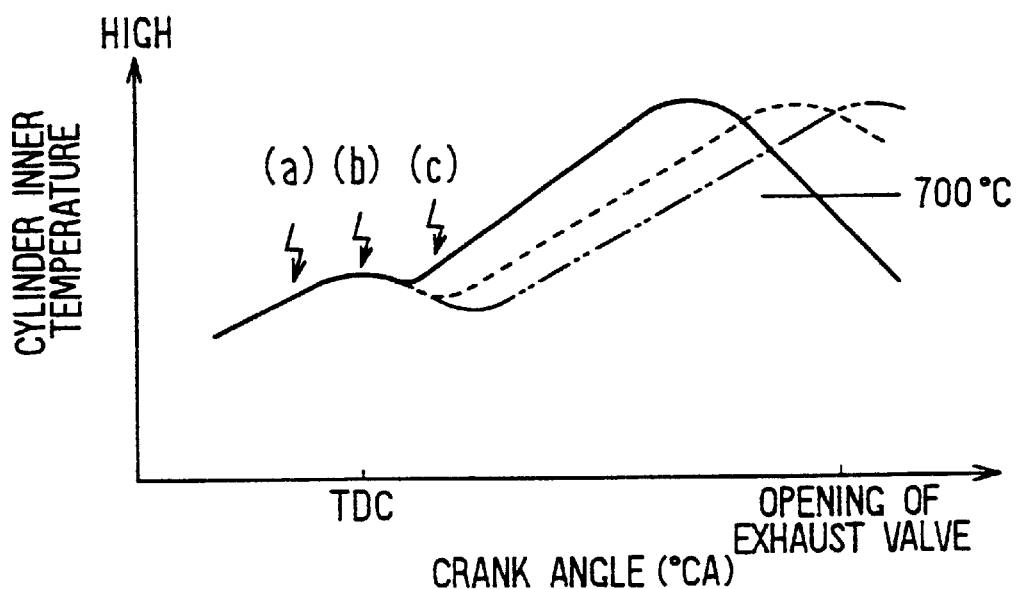
FIG. 21 is a graph showing test results of raising cylinder inner temperature.

Next, the effect of increasing the cylinder inner temperature by the ignition retardation and the slightly leaning of the air-fuel ratio will be explained by using FIGS. 21 and 22. FIG. 21 is a graph for explaining the effect of increasing the cylinder inner temperature by the ignition retardation. In FIG. 21, a solid line, a dotted line and a two-dot chain line indicate transition of the cylinder inner temperature when the ignition timing is set respectively at:

(a) BTDC 10° CA,
(b) compression TDC, and
(c) ATDC 10° CA.

In FIG. 21, the cylinder inner temperature rises once along with the combustion of air-fuel mixture and drops thereafter. However, the peak of the cylinder inner temperature has already passed before the exhaust valve 12 is opened and the cylinder inner temperature has dropped when that valve 12 is opened in the timing (a) which corresponds to the normal ignition timing. Meanwhile, it may be confirmed that the cylinder inner temperature reaches its peak value when the exhaust valve is opened in the timings (b) and (c) and that temperature of the exhaust gas emitted via the exhaust valve 12 reaches 700° C. or more which is required for the post-burning within the exhaust pipe. It can be also understood that the more the ignition timing is controlled to the retard angle side, the slower the burning velocity becomes and the slower the peak of the cylinder inner temperature is.

Figure 22:
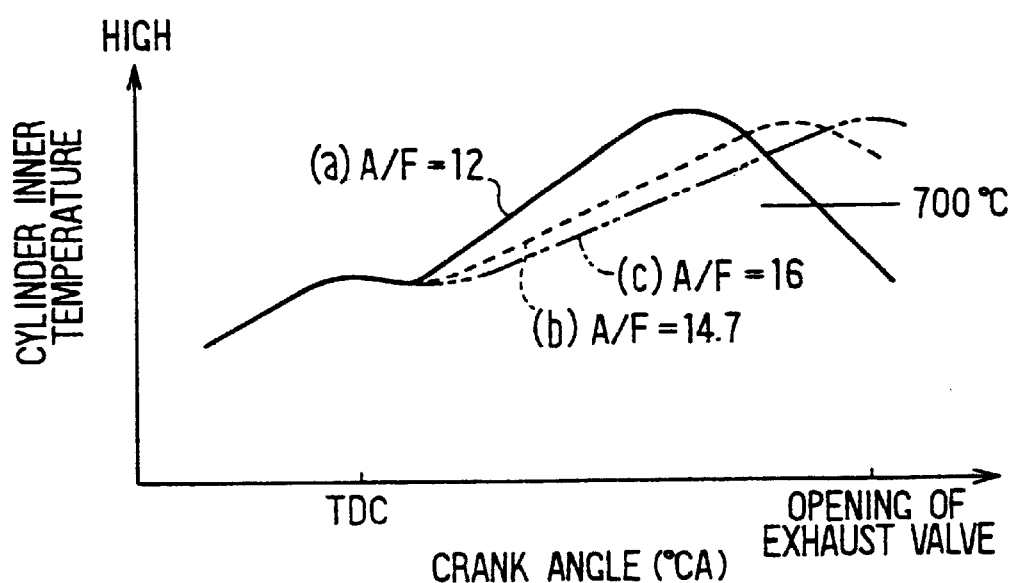
FIG. 22 is a graph showing test results of raising cylinder inner temperature.

Meanwhile, FIG. 22 is a graph for explaining the effect of increasing the cylinder inner temperature by the slightly leaning of the air-fuel ratio. In FIG. 22, a solid line, a dotted line and a two-dot chain line indicate transition of the cylinder inner temperature when the air-fuel ratio is set respectively at:

(a) A/F=12,
(b) stoichiometric ratio (A/F=14.7), and
(c) A/F=16.

It is noted that each of (a) through (c) indicate experimental data at the same ignition timing.

In FIG. 22, the peak of the cylinder inner temperature has already passed before the exhaust valve 12 is opened and the cylinder inner temperature has dropped when the valve 12 is opened in (a) in which the air-fuel ratio is richened. Meanwhile, it may be confirmed that the cylinder inner temperature reaches its peak value when the exhaust valve 12 is opened in the timings (b) and (c) and that temperature of the exhaust gas emitted via the exhaust valve 12 reaches 700° C. or more which is required for the post-burning within the exhaust pipe 3. It can be also seen that the leaner the air-fuel ratio, the slower the burning velocity becomes and the slower the peak of the cylinder inner temperature is.

Figure 23:
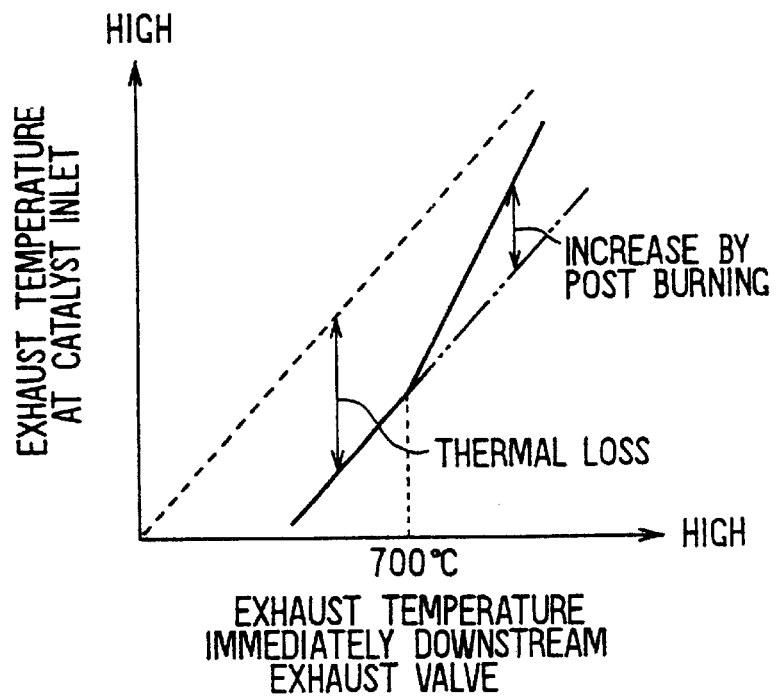
FIG. 23 is a graph showing exhaust gas temperature immediately downstream of the exhaust valve and exhaust gas temperature at the inlet of the catalyst.

When exhaust gas temperature immediately downstream the exhaust valve 12 is compared with exhaust gas temperature at the inlet of the catalyst 13, the temperature of the latter is normally lower by thermal loss within the exhaust pipe 3 as shown in FIG. 23. However, when exhaust gas temperature becomes higher than the temperature (700° C.) which allows the post-burning within the exhaust pipe 3 by implementing the processes for warming up the catalysts 13 and 14 by retarding the ignition and by slightly leaning the air-fuel ratio as described above, the exhaust gas temperature rises as indicated by the solid line due to the post-burning. At this time, the drop of the temperature at the inlet of the catalysts 13 and 14 is lessened by the effect of raising the temperature caused by the post-burning.

As described above, the following effects may be attained by the second embodiment.

(1) The exhaust gas temperature becomes high when the exhaust valve 12 is opened because the burning velocity within the cylinder is controlled by retarding the ignition timing in starting the engine 1 in the cold state. At this time, the post-burning within the exhaust pipe 3 may be effected due to the rise of the exhaust gas temperature. The high temperature exhaust gas may be sent to the catalyst converters 13 and 14 reliably and the quick activation of the catalyst converters 13 and 14 in the cold state may be accelerated by the effect of raising temperature in emitting gas and by the effect of the post-burning within the exhaust pipe 3.

(2) It is possible to eliminate the problem that derivability is worsened due to fluctuation of torque by suppressing the fluctuation of torque by implementing the multiple ignition in controlling the burning velocity by the ignition retardation and others. Because it also stabilizes the combustion state by preventing misfire and the like, the limit of retardation of ignition timing may be extended.

(3) Oxygen necessary for the post-burning may be assured because the stoichiometric or slightly leaning is implemented in addition of the control of the ignition retardation in starting the engine 1 in the cold state. Accordingly, the effect of raising the exhaust gas temperature may be attained more reliably.

(4) Because the target air-fuel ratio AFtg is set based on the retardation correction value θRE in starting the engine 1 in the cold state such that the greater the retardation correction value θRE, the closer to the stoichiometric air-fuel ratio the target air-fuel ratio AFtg becomes, the exhaust gas temperature may be controlled to desirable temperature by the complex effect of the both control while stabilizing the combustion.

(5) The deviation of the air-fuel ratio right after when the A/F sensor 15 is activated is stored and held as the correction value FD in implementing the slightly lean control of the air-fuel ratio in starting the engine and an injection amount is corrected while reflecting the correction value FD in starting the engine in the next time. It improves accuracy of the control of the air-fuel ratio on the way of the slightly leaning at the beginning of the start of the engine.

(6) Because the ignition interval and the ignition number of times are set variably corresponding to parameters of combustion conditions such as the engine speed Ne and the ignition timing in implementing the multiple ignition, firing of each ignition and distribution of each flame may be adequately attained.

(7) Because it is determined whether or not the control of burning velocity is allowed based on the engine operating conditions in starting in the cold state, it allows the control of burning velocity to be implemented only in predetermined engine operating conditions and troubles of increasing the exhaust gas temperature unnecessarily and of damaging the catalysts and exhaust pipe to be avoided.

(8) Because the second embodiment is arranged so as to allow the control of burning velocity to be implemented in a period of predetermined time (15 seconds) after completing to start the engine 1, the processes of the ignition retardation and the slightly leaning of the air-fuel ratio are stopped and the combustion state may be stabilized by the normal control after completing to warm up the catalyst converters quickly.

(Third Embodiment)

Figure 24:
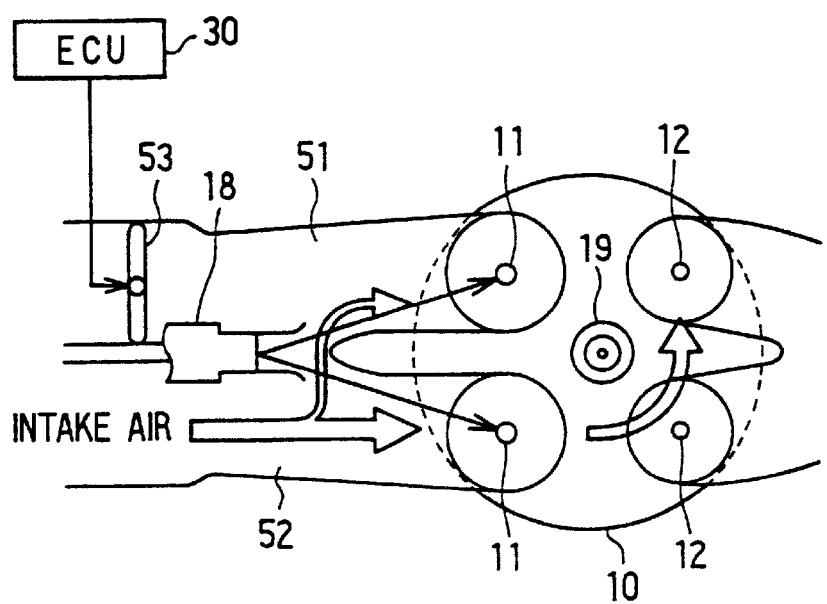
FIG. 24 is a schematic view showing a swirl generating mechanism according to a third embodiment.

In the third embodiment which is a modification of the second embodiment, a swirl generating mechanism for generating swirl flow within the engine cylinder (within the combustion chamber) is provided as shown in FIG. 24. The injector 18 is provided between ramified intake ports 51 and 52 and injects fuel in two directions. The fuel injected by the injector 18 is introduced to the combustion chamber 10 from two intake valves 11.

A swirl control valve 53 is provided at one side of the two intake ports 51 and 52. An opening angle of the swirl control valve 53 is controlled corresponding to a control signal from the ECU 30. For instance, when the swirl control valve 53 is closed as shown in the figure, one of the intake port 51 is closed and swirl is generated within the combustion chamber 10 by a flow of intake air introduced from the other intake port 52.

The swirl control valve 53 is closed in general to improve the flow of the fuel and air mixture within the cylinder 10 by generating the swirl when the combustion state is worsened relatively like when lean burn is implemented. The swirl control valve 53 is kept totally opened in starting the engine. However, according to the present embodiment, the swirl control valve 53 is closed to accelerate the generation of swirl when it is necessary to warm up the catalysts in starting the engine. That is, because the multiple ignition is implemented in order to suppress the fluctuation of torque which otherwise occurs in retarding the ignition timing in starting the engine in the cold state as described above, the present embodiment assists the formation of the plurality of flames at that time by generating the swirl.

Figure 25:
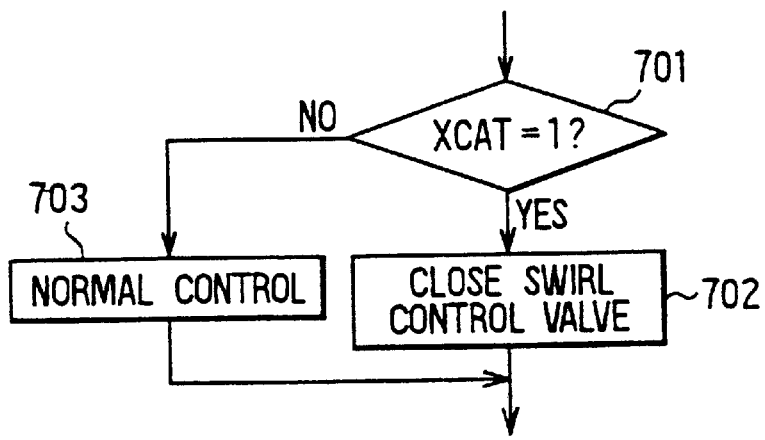
FIG. 25 is a flow diagram showing a swirl control process.

Specifically, the ECU 30 carries out a process shown in FIG. 25 in controlling the swirl control valve 53. That is, it determines at Step 701 whether or not the above catalyst warm-up execution flag XCAT is 1. When XCAT=1, it closes the swirl control valve 53 to generate swirl at Step 702. When XCAT=0, it carries out the normal swirl control at Step 703.

According to the third embodiment described above, the following results may be attained in addition to the effects (1) through (8) described in the second embodiment. That is:

(9) The control system is arranged so as to accelerate the generation of swirl in implementing the multiple ignition, so that it can assist the formation of a plurality of flames and the effect for stabilizing combustion by the multiple ignition may be enhanced further.

(Fourth Embodiment)

In the fourth embodiment which is also a modification of the second embodiment, the valve opening overlap of the intake valve 11 and the exhaust valve 12 is controlled to a predetermined angle in controlling the cylinder inner burning velocity. This control may be carried out in conformity with the process in FIG. 4 in the first embodiment for example. It is carried out by advancing the opening/closing timing of the exhaust valve 12 by 15° CA from the most retarded position when the implementation conditions for warming up the catalysts 13 and 14 hold (when XCAT=1 in the second embodiment) to set the valve opening overlap of the intake valve 11 and the exhaust valve 12 at 30° CA. Thereby, the intake and exhaust valves open/close as shown in FIG. 5 described before.

The present embodiment allows the burning velocity within the cylinder to be controlled as the internal EGR increases. AT this time, unburned fuel not burned within the cylinder 10 is emitted to the exhaust pipe 3 and is fired by itself and burned (post-burning). It also becomes possible to emit exhaust gas around the peak of the cylinder inner temperature by advancing the valve opening timing of the exhaust valve 12, thus contributing to the acceleration of the post-burning. Accordingly, the exhaust gas temperature may be kept high and the quick activation of the catalyst converters 13 and 14 may be realized.

Figure 26:
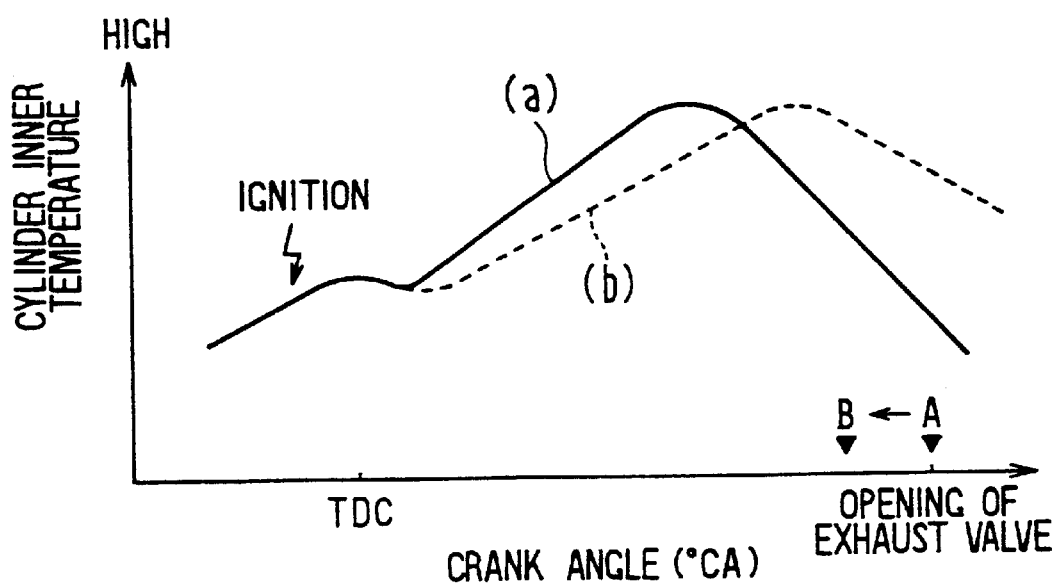
FIG. 26 is a graph for confirming the effect of raising the cylinder inner temperature according to a fourth embodiment.
Figure 27A:
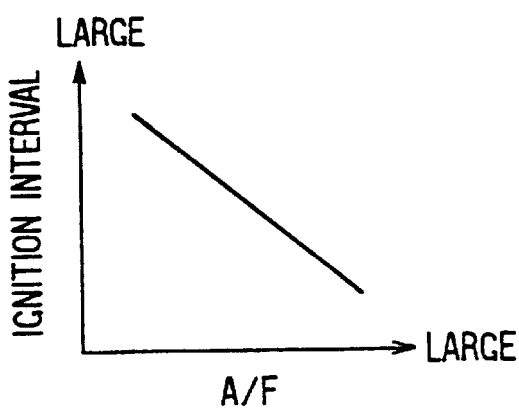
FIGS. 27A through 27D are graphs for setting the ignition intervals of the multiple ignition according to a modification.
Figure 27B:
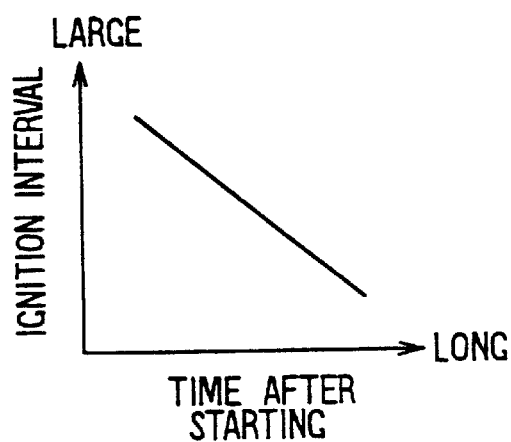
Figure 27C:
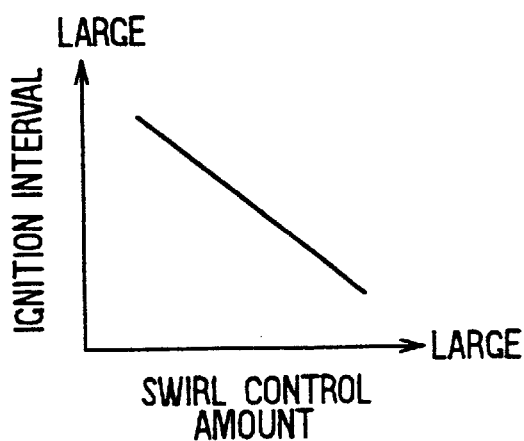
Figure 27D:
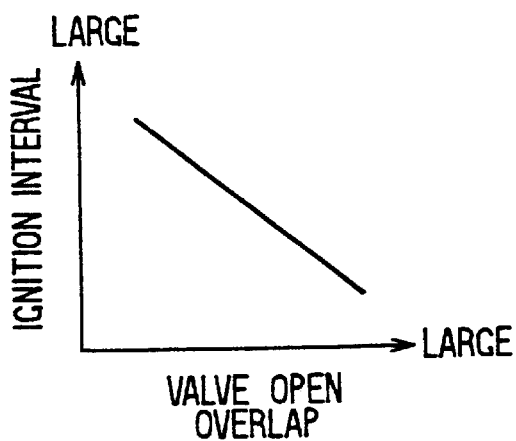
Figure 28A:
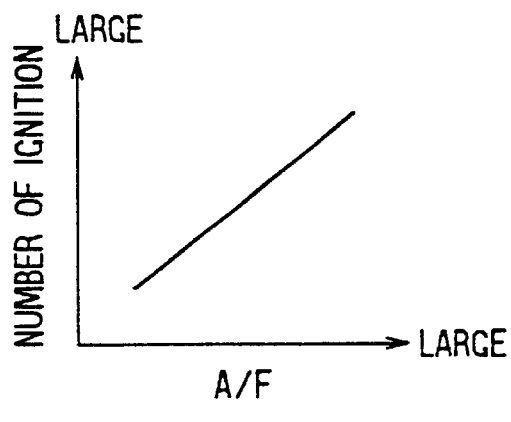
FIGS. 28A through 28D are graphs for setting the ignition number of times of the multiple ignition according to a modification.
Figure 28B:
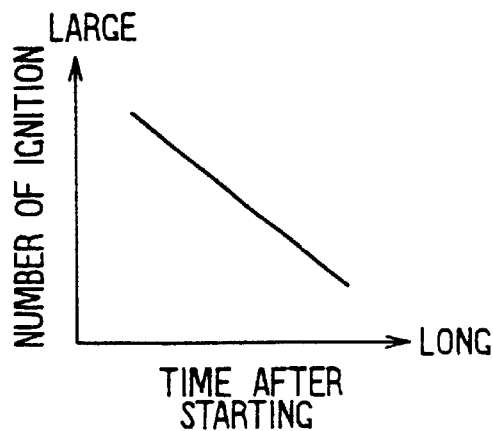
Figure 28C:
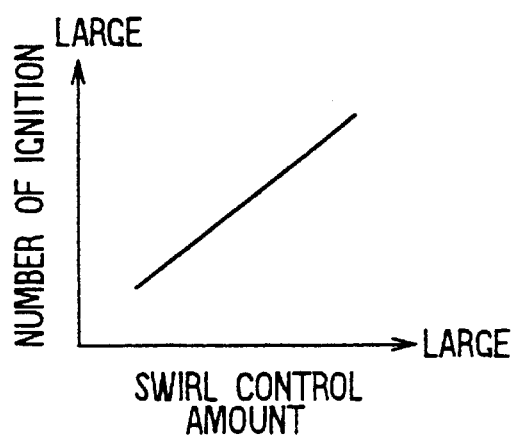
Figure 28D:
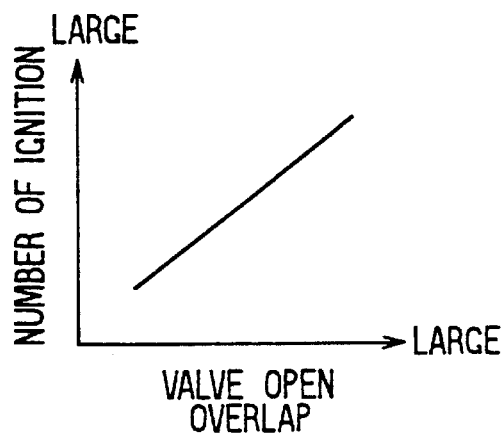

FIG. 26 is a graph for explaining the effect of raising the cylinder inner temperature by the increase of the valve opening overlap of the intake and exhaust valves. In the figure, a solid line and a dotted line indicate transition of the cylinder inner temperature, respectively, when:

(a) normal control; and (b) valve opening overlap=20° CA.

It can be seen from FIG. 26 by comparing (a) with (b) that the peak of the cylinder inner temperature of (b) is slower and the temperature of exhaust gas emitted when the exhaust valve is opened is higher. It can be also seen that the temperature of the exhaust gas emitted via the exhaust valve 12 rises by advancing the valve opening timing of the exhaust valve 12 from A to B in the figure.

It is noted that the present invention may be embodied in the following modes beside those described above.

Although the four processes of:
(a) controlling the air-fuel ratio at the slightly lean ratio;
(b) controlling the ignition timing at the retard angle side;
(c) increasing the valve opening overlap of the intake valve 11 and the exhaust valve 12; and
(d) advancing the valve opening timing of the exhaust valve 12;

have been applied in the first embodiment, the above arrangement may be modified on the condition that the effect of high temperature exhaust gas may be attained. For instance, the catalyst converter may be activated quickly by implementing solely the above item (c). It has been confirmed by the inventor of the present invention that the effect of the high temperature exhaust gas may be attained by such arrangement. It is also possible to combine the other items (a), (b) and (d) appropriately with the item (c) which is at least carried out.

Although the valve opening overlap of the intake valve 11 and the exhaust valve 12 is set at 30° CA and the valve opening timing of the exhaust valve 12 is advanced by 15° CA in the first and fourth embodiments, they may be modified as follows. For instance, the valve opening overlap of the intake valve 11 and 12 is modified within a range of 20 to 30° CA and the valve opening timing of the exhaust valve 12 is modified within a range of 10 to 20° CA. Temperature of exhaust gas rises and the catalysts may be quickly activated also in such case as compared to the existing system.

Although the valve timing of the both intake and exhaust sides has been variably controlled in the first and fourth embodiments, this arrangement is modified here. For instance, the VVT mechanism is provided only on the exhaust side to control the valve timing of only the exhaust side. Then, the exhaust valve is advanced to raise the temperature of exhaust gas in warming up the catalysts.

Although the phase controlled type VVT mechanism (variable valve timing mechanism) has been adopted in the first and fourth embodiments, a VVT mechanism having another structure may be adopted. For instance, it may be a VVT mechanism which allows a plurality of kinds of cam units having different cam profiles to be switched. That is, it will be possible that the VVT mechanism has the arrangement which allows the valve opening overlap of the intake and exhaust valves and the advancement of the exhaust valve to be variably controlled.

Although it has been determined whether or not 20 seconds has elapsed since the start of cranking or the state has put into the non-idling state as the condition for continuing the warm-up of the catalysts in the first embodiment (Step 130, 230 and 330 in FIGS. 2 through 4), this condition may be modified. For instance, it is possible to determine that the warm-up of the catalyst has been completed by measuring (or estimating) temperature of the catalyst and by detecting that the temperature of the catalyst has reached to temperature of completing the warm-up. In this case, the warm-up completing temperature need not be the catalyst activating temperature and may be temperature lower than that by anticipating heat of reaction of the catalyst converter.

Alternatively, it is possible to determine that the warm-up of the catalyst has been completed based on the result detected by the A/F sensor 15 at the downstream side of the catalyst converter 13. In this case, it is determined that the warm-up has been completed when an output value of the A/F sensor 15 changes while fuel is injected with the same air-fuel ratio (slightly lean air-fuel ratio) assuming that the catalyst converter 13 is activated and starts its catalyst reaction. Such arrangement may be realized because the A/F sensor 15 is activated quickly as compared to the catalyst converter.

Although the retardation correction value θRE for warming up the catalysts 13 and 14 in starting the engine 1 in the cold state has been calculated and the retardation correction value θRE is subtracted from the basic ignition timing θBSE to calculate the final ignition timing θig (at Steps 508 and 509 in FIG. 11), this arrangement may be modified. That is, a preset ignition timing set on the retard angle side, e.g., a value within TDC through ATDC 10° CA, in starting the engine 1 in the cold state is selected to set it as the final ignition timing.

Although it has been determined whether or not to warm up the catalysts from the determination result of Step 401 through 405 in FIG. 10 in the second embodiment described above, part of the determination item may be modified. For instance, the following items may be added appropriately in the determination of FIG. 10 and the control of the cylinder inner burning velocity is not implemented to warm up the catalyst when each of those items does not hold (set as XCAT=0):

determine whether or not the air-fuel ratio is extremely rich; and determine whether or not the engine speed is controlled to a predetermined starting-time speed, e.g., 1200±100 rpm, by implementing first idling.

Here, it is possible to shorten the time from ignition to opening of the exhaust valve by increasing the engine speed to the starting-time speed, e.g., 1200 rpm, during the first idling and the effect of raising the temperature of exhaust gas may be enhanced further.

Although the ignition interval and the ignition number of times have been variably set corresponding to the engine speed, the engine load, ignition timing and others by using FIGS. 16 and 17 in implementing the multiple ignition in the second embodiment, this arrangement may be modified. For instance, the ignition interval and the ignition number of times may be variably set by any one of or by a combination of the air-fuel ratio, an elapsed time since the start of the engine, the control of the swirl control valve, the valve opening overlap of the intake and exhaust valves and others. That is, the ignition interval may be set by using the relationships in FIGS. 27A through 27D and the ignition number of times may be set by using the relationships in FIGS. 28A through 28D. Firing of each ignition and distribution of each flame may be attained adequately in implementing the multiple ignition and the effect of the multiple ignition may be enhanced by such arrangement. Alternatively, it is possible to realize the present invention by fixing the ignition interval and the ignition number of times.

Although the multiple ignition has been implemented for suppressing the fluctuation of torque in the second embodiment, this may be modified. For instance, the multi-point ignition of igniting at plurality of locations within the combustion chamber may be carried out. Actually, ignition plugs are provided at a plurality of locations and combustion is improved by sequentially generating spark from each of those ignition plugs.

Although the swirl has been generated within the cylinder as necessary in the third embodiment, it is possible to arrange so as to generate tumble as necessary instead of swirl. In such a case, it is possible to assist the formation of a plurality of flames or at plurality of locations and the effect for stabilizing the combustion may be enhanced by the multiple ignition or the multi-point ignition by promoting the generation of the tumble.

Although the catalyst converter 13 has been provided in the engine exhaust pipe as the start catalyst to quickly activate the start catalyst in each of the embodiments described above, it may be applied to a unit having no start catalyst as a matter of course.

Although the temperature of the exhaust gas has been raised in order to quickly activate the catalyst converters 13 and 14 in starting the engine 1 in the cold state, it is possible to arrange so as to raise the temperature of the exhaust gas to keep the catalyst active state when the active state of the catalyst drops while operating the engine. For example, the temperature of the exhaust gas may be raised by monitoring temperature of the catalyst converter and by controlling the valve opening overlap of the intake and exhaust valves, by retarding the ignition or by slightly leaning the air-fuel ratio.

What is claimed is:

1. A catalyst activation control system for a spark ignition type internal combustion engine comprising:

a catalyst converter provided in an engine exhaust pipe;

a variable valve timing mechanism for variably controlling opening/closing timing of at least one of an intake valve and an exhaust valve; and a valve controller for controlling valve opening overlap of the intake valve and the exhaust valve to a predetermined amount by controlling the variable valve timing mechanism when the engine is cold;

wherein the valve controller controls closing time of the exhaust valve to an advance side relative to a top dead center timing of the engine.

2. A method of controlling catalyst activation for a spark ignition type internal combustion engine comprising:

providing a catalyst converter in an engine exhaust pipe;

variably controlling opening/closing timing of at least one of an intake valve and an exhaust valve;

controlling valve opening overlap of the intake valve and the exhaust valve to a predetermined amount by controlling variable valve timing when the engine is cold; and retarding ignition timing of the engine when the engine is cold.

3. A method of controlling catalyst activation for a spark ignition type internal combustion engine comprising:

providing a catalyst converter in an engine exhaust pipe;

variably controlling opening/closing timing of at least one of an intake valve and an exhaust valve; and controlling valve opening overlap of the intake valve and the exhaust valve to a predetermined amount by controlling variable valve timing mechanism when the engine is cold;

wherein a closing time of the exhaust valve is controlled to an advance side relative to a top dead center timing of the engine.

4. A catalyst activation control system for a spark ignition type internal combustion engine comprising:

a catalyst converter provided in an engine exhaust pipe;

a variable valve timing mechanism for variably controlling opening/closing timing of at least one of an intake valve and an exhaust valve;

valve controller for controlling valve opening overlap of the intake valve and the exhaust valve to a predetermined amount by controlling the variable valve timing mechanism when the engine is cold; and an air-fuel ratio controller for controlling an air-fuel ratio of intake fuel and air mixture to a stoichiometric air-fuel ratio or slightly lean ratio when the engine is cold.

5. The control system according to claim 4, wherein:

the valve controller advances the valve opening timing of the exhaust valve by about 10 to 20° CA.

6. The control system according to claim 4, wherein:

processes carried out when the engine is cold including the valve timing control is prohibited during a predetermined period at least until when starting of the engine is completed.

7. A method of controlling catalyst activation for a spark ignition type internal combustion engine comprising:

providing a catalyst converter in an engine exhaust pipe;

variably controlling opening/closing timing of at least one of an intake valve and an exhaust valve; and controlling valve opening overlap of the intake valve and the exhaust valve to a predetermined amount by controlling variable valve timing when the engine is cold; and controlling an air-fuel ratio of intake fuel and air mixture to a stoichiometric air-fuel ratio or slightly lean ratio when the engine is cold.

8. The method according to claim 7, wherein:

the valve opening timing of the exhaust valve is advanced by about 10 to 20° CA.

9. The method according to claim 7, wherein:

processes carried out when the engine is cold including the valve timing control is prohibited during a predetermined period at least until when starting of the engine is completed.

10. A catalyst activation control system for a spark ignition type internal combustion engine comprising:

a catalyst converter provided in an engine exhaust pipe;

a variable valve timing mechanism for variably controlling opening/closing timing of at least one of an intake valve and an exhaust valve; and valve control means for controlling valve opening overlap of the intake valve and the exhaust valve to a predetermined amount by controlling the variable valve timing mechanism when the engine is cold;

wherein: the valve control means sets the vavle opening overlap of the intake valve and the exhaust valve to around 20 to 30° CA.

11. The control system according to claim 10, further comprising:

ignition timing control means for retarding ignition timing of the engine when the engine is cold.

12. The control system according to claim 10, further comprising:

air-fuel ratio control means for controlling an air-fuel ratio of intake fuel and air mixture to a stoichiometric air-fuel ratio of slightly lean ratio when the engine is cold.

13. The control system according to claim 10, wherein:

processes carried out when the engine is cold including the valve timing control is prohibited during a predetermined period at least until when starting of the engine is completed.

14. The control system according to claim 10, wherein:

the variable valve timing mechanism variably controls opening/closing timing of at least the exhaust valve; and the valve control means controls opening timing of the exhaust valve to an advance side more than that right after starting the engine by controlling the variable valve timing mechanism when the engine is cold.

15. The control system according to claim 14, wherein:
the valve control means advances the valve opening timing of the exhaust valve by about 10 to 20° CA.

16. A method of controlling catalyst activation for a spark ignition type internal combustion engine comprising:
   providing a catalyst converter in an engine exhaust pipe;
   variably controlling opening/closing timing of at least one of an intake valve and an exhaust valve; and
   controlling valve opening overlap of the intake valve and the exhaust valve to a predetermined amount by controlling variable valve timing when the engine is cold;
   wherein controlling the valve opening overlap comprises setting the valve opening overlap of the intake valve and the exhaust valve to around 20 to 30° CA.

17. The method according to claim 16, further comprising retarding ignition timing of the engine when the engine is cold.

18. The method according to claim 16, further comprising:
controlling an air-fuel ratio of intake fuel and air mixture to a stoichiometric air-fuel ratio or slightly lean ratio when the engine is cold.

19. The method according to claim 16, wherein:
processes carried out when the engine is cold including the valve timing control is prohibited during a predetermined period at least until when starting of the engine is completed.

20. The method according to claim 16, wherein:
the opening/closing timing of at least the exhaust valve is variably controlled; and
the opening timing of the exhaust valve is controlled to an advance side more than that right after starting the engine by controlling the variable valve timing mechanism when the engine is cold.

21. The method according to claim 20, wherein:
the valve opening timing of the exhaust valve is advanced by about 10 to 20° CA.

* * * * *

UNITED STATES PATENT AND TRADEMARK OFFICE
CERTIFICATE OF CORRECTION

PATENT NO.    : 6,513,319 B2
DATED         : February 4, 2003
INVENTOR(S)   : Nozawa et al.

It is certified that error appears in the above-identified patent and that said Letters Patent is hereby corrected as shown below:

<u>Title page,</u>
Item [75], Inventors, please delete co-inventor "Yoshihiro Majima".

Signed and Sealed this

Twenty-sixth Day of August, 2003

JAMES E. ROGAN
*Director of the United States Patent and Trademark Office*